United States Patent
Liu et al.

(10) Patent No.: US 11,523,361 B2
(45) Date of Patent: *Dec. 6, 2022

(54) METHOD, TERMINAL DEVICE AND NETWORK DEVICE FOR TIME ADVANCE ADJUSTMENT

(71) Applicant: TELEFONAKTIEBOLAGET LM ERICSSON (PUBL), Stockholm (SE)

(72) Inventors: Jinhua Liu, Beijing (CN); Stefan Parkvall, Bromma (SE); Robert Baldemair, Solna (SE); Mats Folke, Vällingby (SE); Henrik Enbuske, Stockholm (SE); Min Wang, Luleå (SE); Jan Christoffersson, Luleå (SE); Henrik Sahlin, Mölnlycke (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/581,708

(22) Filed: Jan. 21, 2022

(65) Prior Publication Data

US 2022/0150860 A1 May 12, 2022

Related U.S. Application Data

(63) Continuation of application No. 16/096,386, filed as application No. PCT/CN2018/097162 on Jul. 26, 2018, now Pat. No. 11,284,367.

(30) Foreign Application Priority Data

Aug. 11, 2017 (WO) ................ PCT/CN2017/097040

(51) Int. Cl.
*H04W 56/00* (2009.01)
*H04L 27/26* (2006.01)
(Continued)

(52) U.S. Cl.
CPC ..... *H04W 56/0045* (2013.01); *H04L 27/2607* (2013.01); *H04L 27/26025* (2021.01);
(Continued)

(58) Field of Classification Search
None
See application file for complete search history.

(56) References Cited

U.S. PATENT DOCUMENTS 11,284,367 B2* 3/2022 Liu .................. H04L 27/26025
2016/0323070 A1 11/2016 Chen et al.
(Continued)

FOREIGN PATENT DOCUMENTS

CN 106506412 A 3/2017
CN 106993335 A 7/2017
(Continued)

OTHER PUBLICATIONS

Ericsson, R4-1706716, "Requirements for NR UE timing advance", 3GPP TSG-RAN WG4 Meeting NR#2 Ad Hoc, R4-1706716, Qingdao, China, Jun. 27-29, 2017.
(Continued)

*Primary Examiner* — Anh Vu H Ly

(57) ABSTRACT

Methods, network nodes, and terminal devices are disclosed along with associated host computers and communication systems for providing over-the-top services. A method comprises receiving a time advance, TA, command from a network node; determining a TA granularity or range; and determining a TA value based at least partly on the TA command and the TA granularity or range, wherein different numerologies are configured for at least two carriers and/or at least two bandwidth parts (BWPs) in one carrier, wherein the at least two carriers and/or the at least two BWPs serve the terminal device and/or the terminal device supports at least one numerology.

14 Claims, 16 Drawing Sheets

(51) Int. Cl.
*H04W 72/12* (2009.01)
*H04W 72/14* (2009.01)
*H04W 80/02* (2009.01)

(52) U.S. Cl.
CPC ....... *H04W 72/1268* (2013.01); *H04W 72/14* (2013.01); *H04W 80/02* (2013.01)

(56) References Cited

U.S. PATENT DOCUMENTS

| | | | |
|---|---|---|---|
| 2018/0279115 A1* | 9/2018 | Tanna | H04L 61/1588 |
| 2019/0053182 A1 | 2/2019 | Choi et al. | |
| 2019/0053228 A1 | 2/2019 | Akkarakaran et al. | |
| 2019/0174513 A1 | 6/2019 | Loehr et al. | |
| 2019/0349878 A1 | 11/2019 | Ashraf et al. | |

FOREIGN PATENT DOCUMENTS

| | | | | |
|---|---|---|---|---|
| EP | 3301986 A1 | * | 4/2018 | ........ H04W 28/0278 |
| WO | 2013120258 A1 | | 8/2013 | |
| WO | 2016000198 A1 | | 1/2016 | |
| WO | 2017097225 W | | 6/2017 | |
| WO | 2017097227 A1 | | 6/2017 | |

OTHER PUBLICATIONS

Qualcomm Incorporated, R1-1711208, "Timing advance for different numerology", 3GPP TSG-RAN WG1 NR AdHoc#2, R1-1711208, Jun. 27-30, 2017, Qingdao, China.

Qualcomm Incorporated, R1-1711209, "CA with mixed numerology", 3GPP TSG RAN WG1 NR Ad-Hoc#2, R1-1711209, Jun. 27-30, 2017, Qingdao, P.R. China.

* cited by examiner

METHOD, TERMINAL DEVICE AND NETWORK DEVICE FOR TIME ADVANCE ADJUSTMENT

RELATED APPLICATIONS

This nonprovisional application is a continuation application of U.S. patent application Ser. No. 16/096,386 filed Oct. 25, 2018, which is a U.S. National Stage Filing under 35 U.S.C. § 371 of International Patent Application Serial No. PCT/CN2018/097162 filed Jul. 26, 2018 and entitled "METHOD, TERMINAL DEVICE AND NETWORK DEVICE FOR TIME ADVANCE ADJUSTMENT" which claims priority to International Patent Application Serial No. PCT/CN2017/097040 filed Aug. 11, 2017, all of which are hereby incorporated by reference in their entirety.

TECHNICAL FIELD

Embodiments of the disclosure generally relate to wireless communication, and, more particularly, to method, network device and terminal device for time advance (TA) adjustment.

BACKGROUND

TA is used in certain wireless networks such as Global System for Mobile Communications (GSM) and Long Term Evolution (LTE). Orthogonality in the uplink may be either partly or fully achieved by separating the user transmissions in the time domain. In order to maintain such separation, a network device may need to receive the transmissions from various devices connected to a given network at substantially the time the transmissions would be expected if there were no propagation delay. In the case of LTE and GSM, such reception is ensured by means of a procedure known as the TA.

For example, in the radio resource control (RRC) connected mode in LTE, E-UTRAN Node B (eNB) is responsible for maintaining the uplink timing through the timing advance procedure. The uplink timing of a user equipment (UE) is measured by the eNB using a physical random access channel (PRACH) and/or a periodic sounding reference signal (SRS) transmitted by the UE. Periodic timing advance commands are transmitted by the eNB to maintain the uplink timing based on the received SRS signals. In the case of LTE, a UE knows when it is uplink synchronized and when it is not, based on a timer whose value is set by the network. While the time alignment timer is running, the LTE UE is considered to be in a synchronized state. The timer is restarted when a new timing advance command is received from the eNB. When a UE is not uplink synchronized, the UE is forced to release all synchronous uplink resources and initiates an uplink transfer only after a RACH procedure, upon which the uplink timing is re-attained.

SUMMARY

This summary is provided to introduce a selection of concepts in a simplified form that are further described below in detailed description. This summary is not intended to identify key features or essential features of the claimed subject matter, nor is it intended to be used to limit the scope of the claimed subject matter.

It is noted that GSM/LTE only supports a single numerology operation in a carrier and a fixed TA adjustment configuration. Recently, multiple numerology operation in a carrier in a new radio (NR) system was agreed in RAN1 of 3GPP (the 3rd Generation Partnership Project). However, the fixed TA adjustment configuration used in a wireless network supporting single numerology operation such as LTE/GSM might not suit the wireless networks supporting multiple numerology operation very well. Therefore, it would be desirable to provide a solution for TA adjustment in the networks supporting multiple numerology operation.

According to an aspect of the disclosure, it is provided a method for operating a terminal device. The method may comprise: receiving a time advance, TA, command from a network device; determining a TA granularity; and determining a TA value based at least partly on the TA command and the TA granularity. Different numerologies may be configured for at least two carriers, wherein the at least two carriers serve the terminal device and the terminal device supports multiple numerologies.

In an embodiment, the TA granularity is determined by a numerology of the multiple numerologies used by the terminal device, wherein there is a correspondence between numerology and TA granularity.

In an embodiment, the numerology comprises the subcarrier spacing, SCS.

In an embodiment, determining the TA value based at least partly on the TA command and a TA granularity comprises: updating a previous TA value considering the difference between an old TA granularity and a new TA granularity; calculating a TA compensation based on the new TA command and the new TA granularity; and determining the TA value based on the updated TA value and the TA compensation.

According to another aspect of the disclosure, it is provided a method for operating a terminal device. The method may comprise: receiving a time advance, TA, command from a network device; determining a TA granularity; and determining a TA value based at least partly on the TA command and the TA granularity. The TA granularity is determined by a numerology of multiple numerologies used by the terminal device, wherein there is a correspondence between numerology and TA granularity.

In an embodiment, wherein different numerologies are configured for at least two carriers, wherein the at least two carriers serve the terminal device and the terminal device supports multiple numerologies.

In an embodiment, wherein the numerology comprises the subcarrier spacing, SCS.

In an embodiment, determining the TA value based partly on the TA command and a TA granularity comprises: updating a previous TA value considering the difference between an old TA granularity and a new TA granularity; calculating a TA compensation based on the new TA command and the new TA granularity; and determining the TA value based on the updated TA value and the TA compensation.

According to another aspect of the disclosure, it is provided a method for operating a terminal device. The method comprises receiving a TA command from a network device; determining a TA granularity or range; and determining a TA value based at least partly on the TA command and the TA granularity or range, wherein different numerologies are configured for at least two carriers and/or at least two bandwidth parts (BWPs) in one carrier, wherein the at least two carriers and/or the at least two BWPs serve the terminal device and the terminal device supports at least one numerology.

In an embodiment, the TA granularity or range is determined by one or more of a cyclic prefix (CP) length, a numerology and a carrier frequency used by the terminal device, wherein there is a correspondence between CP length and TA granularity or range, a correspondence between numerology and TA granularity or range, and a correspondence between carrier frequency and TA granularity or range, wherein the correspondences are preconfigured in the network device and/or the correspondences are preconfigured in the terminal device or signaled to the terminal device.

In an embodiment, the method further comprises receiving a message containing the TA granularity or range from the network device.

In an embodiment, the carrier comprises a plurality of BWPs, each BWP is associated with a numerology, and the carrier has a reference numerology, wherein the TA granularity or range is determined based on the reference numerology and the reference numerology is a numerology with the shortest CP length.

In an embodiment, a reference numerology assigned for terminal devices under an idle state is same in a cell.

In an embodiment, determining the TA value based on one or more of the TA command and a TA granularity or range comprises: updating a previous TA value considering the difference between an old TA granularity or range and a new TA granularity or range; calculating a TA compensation based on the new TA command and the new TA granularity or range; and determining the TA value based on the updated TA value and the TA compensation.

In an embodiment, a format of the TA command is same as a format of the TA command used in a wireless network supporting single numerology operation.

In an embodiment, a format of the TA command is different from a format of the TA command used in a wireless network supporting single numerology operation.

In an embodiment, the format of the TA command changes in relation to the TA command field length change.

In an embodiment, there is a correspondence between the format of the TA command and the TA granularity or range, the method further comprises determining the format of the TA command based on the TA granularity or range.

In an embodiment, the format of the TA command comprises an indicator of the TA granularity or range.

In an embodiment, the TA command is received together with uplink grant or a medium access control (MAC) command associated with uplink grant, wherein the TA granularity or range is determined based on a numerology used for the UL grant or a numerology of the PUSCH (Physical Uplink Shared Channel) scheduled by the UL grant.

In an embodiment, the numerology comprises at least one of the followings: the subcarrier spacing, SCS, the BandWidth Part, BWP.

According to another aspect of the disclosure, it is provided a method for operating a network device. The method comprises determining a time advance, TA, value for a terminal device; determining a TA granularity for the terminal device; generating a TA command based on the TA value and the TA granularity; and sending the TA command to the terminal device. Different numerologies may be configured for at least two carriers, wherein the at least two carriers serve the terminal device and the terminal device supports multiple numerologies.

In an embodiment, the TA granularity is determined by a numerology of the multiple numerologies used by the terminal device, wherein there is a correspondence between numerology and TA granularity.

In an embodiment, the numerology comprises the subcarrier spacing, SCS.

According to another aspect of the disclosure, it is provided a method for operating a network device. The method comprises determining a time advance, TA, value for a terminal device; determining a TA granularity for the terminal device; generating a TA command based on the TA value and the TA granularity; and sending the TA command to the terminal device. The TA granularity is determined by a numerology of multiple numerologies used by the terminal device, wherein there is a correspondence between numerology and TA granularity.

In an embodiment, different numerologies are configured for at least two carriers. The at least two carriers serve the terminal device and the terminal device supports multiple numerologies.

In an embodiment, the numerology comprises the subcarrier spacing, SCS.

According to another aspect of the disclosure, it is provided a method for operating a network device. The method comprises determining a TA value for a terminal device; determining a TA granularity or range for the terminal device; generating a TA command based on the TA value and the TA granularity or range; and sending the TA command to the terminal device, wherein different numerologies are configured for at least two carriers and/or at least two bandwidth parts (BWPs) in one carrier, wherein the at least two carriers and/or the at least two BWPs serve the terminal device and the terminal device supports at least one numerology.

In an embodiment, the TA granularity or range is determined by at least one of a cyclic prefix (CP) length, a numerology and a carrier frequency used by the terminal device, wherein there is a correspondence between CP length and TA granularity or range, a correspondence between numerology and TA granularity or range, and a correspondence between carrier frequency and TA granularity or range, wherein the correspondences are preconfigured in the network device and/or the correspondences are preconfigured in the terminal device or signaled to the terminal device.

In an embodiment, the method further comprises sending a message containing the TA granularity or range to the terminal device.

In an embodiment, the carrier comprises a plurality of BWPs, each BWP is associated with a numerology, and the carrier has a reference numerology, wherein the TA granularity or range is determined based on the reference numerology and the reference numerology is a numerology with the shortest CP length.

In an embodiment, the reference numerology for a TAG is determined based on the operating numerologies of all carriers belonging to the TAG. For instance, the numerology with the largest subcarrier spacing and/or shortest CP length among the said operating numerologies can be determined as reference numerology for the TAG.

In an embodiment, a reference numerology assigned for terminal devices under an idle state is same in a cell.

In an embodiment, a format of the TA command is same as a format of the TA command used in a wireless network supporting single numerology operation.

In an embodiment, a format of the TA command is different from a format of the TA command used in a wireless network supporting single numerology operation.

In an embodiment, the format of the TA command changes in relation to the TA command field length change.

In an embodiment, there is a correspondence between the format of the TA command and the TA granularity or range, the method further comprises determining the format of the TA command based on the TA granularity or range.

In an embodiment, the format of the TA command comprises an indicator of the TA granularity or range.

In an embodiment, the TA command is sent together with uplink grant or a medium access control (MAC) command associated with uplink grant, wherein the TA granularity or range is determined based on a numerology used for the UL grant.

In one embodiment, the TA command is sent together with uplink grant or a medium access control (MAC) command associated with uplink grant, wherein the TA granularity or range is determined based on a numerology of the PUSCH scheduled by the UL grant.

In one embodiment, the numerology comprises at least one of the followings: the subcarrier spacing, SCS, the BandWidth Part, BWP.

According to another aspect of the disclosure, it is provided a terminal device, comprising: a processor; and a memory, the memory containing instructions executable by the processor, whereby the terminal device is operative to: receive a time advance, TA, command from a network device; determine a TA granularity; and determine a TA value based at least partly on the TA command and the TA granularity. Different numerologies are configured for at least two carriers, wherein the at least two carriers serve the terminal device and the terminal device supports multiple numerologies.

According to another aspect of the disclosure, it is provided a terminal device, comprising: a processor; and a memory, the memory containing instructions executable by the processor, whereby the terminal device is operative to: receive a time advance, TA, command from a network device; determine a TA granularity; and determine a TA value based at least partly on the TA command and the TA granularity. The TA granularity is determined by a numerology of multiple numerologies used by the terminal device. There is a correspondence between numerology and TA granularity.

According to another aspect of the disclosure, it is provided a terminal device, comprising: a processor; and a memory, the memory containing instructions executable by the processor, whereby the terminal device is operative to: receive a TA command from a network device; determine a TA granularity or range; and determine the TA value based at least partly on the TA command and the TA granularity or range, wherein different numerologies are configured for at least two carriers and/or at least two bandwidth parts (BWPs) in one carrier, wherein the at least two carriers and/or the at least two BWPs serve the terminal device and the terminal device supports at least one numerology.

According to another aspect of the disclosure, it is provided a network device, comprising: a processor; and a memory, the memory containing instructions executable by the processor, whereby the network device is operative to: determine a time advance, TA, value for a terminal device; determine a TA granularity for the terminal device; generate a TA command based at least partly on the TA value and the TA granularity; and send the TA command to the terminal device. Different numerologies are configured for at least two carriers. The at least two carriers serve the terminal device and the terminal device supports multiple numerologies.

According to another aspect of the disclosure, it is provided a network device, comprising: a processor; and a memory, the memory containing instructions executable by the processor, whereby the network device is operative to: determine a time advance, TA, value for a terminal device; determine a TA granularity for the terminal device; generate a TA command based on the TA value and the TA granularity; and send the TA command to the terminal device. The TA granularity is determined by a numerology of multiple numerologies used by the terminal device, wherein there is a correspondence between numerology and TA granularity.

According to another aspect of the disclosure, it is provided a network device, comprising: a processor; and a memory, the memory containing instructions executable by the processor, whereby the network device is operative to: determine a time advance, TA, value for a terminal device; determine a TA granularity or range for the terminal device; generate a TA command based at least partly on the TA value and the TA granularity or range; and send the TA command to the terminal device. Different numerologies are configured for at least two carriers and/or at least two bandwidth parts (BWPs) in one carrier. The at least two carriers and/or the at least two BWPs serve the terminal device and the terminal device supports at least one numerology.

According to another aspect of the disclosure, it is provided a computer program product. The computer program product comprises instructions which when executed by at least one processor, cause the at least one processor to receive a time advance, TA, command from a network device; determine a TA granularity; and determine a TA value based at least partly on the TA command and the TA granularity. Different numerologies are configured for at least two carriers, wherein the at least two carriers serve the terminal device and the terminal device supports multiple numerologies According to another aspect of the disclosure, it is provided a computer program product. The computer program product comprises instructions which when executed by at least one processor, cause the at least one processor to receive a time advance, TA, command from a network device; determine a TA granularity; and determine a TA value based at least partly on the TA command and the TA granularity. The TA granularity is determined by a numerology of multiple numerologies used by the terminal device. There is a correspondence between numerology and TA granularity.

According to another aspect of the disclosure, it is provided a computer program product. The computer program product comprises instructions which when executed by at least one processor, cause the at least one processor to receive a TA command from a network device; determine a TA granularity or range; and determine the TA value based at least partly on the TA command and the TA granularity or range, wherein different numerologies are configured for at least two carriers and/or at least two bandwidth parts (BWPs) in one carrier, wherein the at least two carriers and/or the at least two BWPs serve the terminal device and the terminal device supports at least one numerology.

According to another aspect of the disclosure, it is provided a computer program product. The computer program product comprises instructions which when executed by at least one processor, cause the at least one processor to determine a time advance, TA, value for a terminal device; determine a TA granularity for the terminal device; generate a TA command based at least partly on the TA value and the TA granularity; and send the TA command to the terminal device. Different numerologies are configured for at least two carriers. The at least two carriers serve the terminal device and the terminal device supports multiple numerologies.

According to another aspect of the disclosure, it is provided a computer program product. The computer program product comprises instructions which when executed by at least one processor, cause the at least one processor to determine a time advance, TA, value for a terminal device; determine a TA granularity for the terminal device; generate a TA command based on the TA value and the TA granularity; and send the TA command to the terminal device, wherein the TA granularity is determined by a numerology of multiple numerologies used by the terminal device, wherein there is a correspondence between numerology and TA granularity.

According to another aspect of the disclosure, it is provided a computer program product. The computer program product comprises instructions which when executed by at least one processor, cause the at least one processor to determine a time advance, TA, value for a terminal device; determine a TA granularity or range for the terminal device; generate a TA command based at least partly on the TA value and the TA granularity or range; and send the TA command to the terminal device, wherein different numerologies are configured for at least two carriers and/or at least two bandwidth parts (BWPs) in one carrier, wherein the at least two carriers and/or the at least two BWPs serve the terminal device and the terminal device supports at least one numerology.

According to another aspect of the disclosure, it is provided a computer readable storage medium. The computer readable storage medium comprises instructions which when executed by at least one processor, cause the at least one processor to receive a time advance, TA, command from a network device; determine a TA granularity; and determine a TA value based at least partly on the TA command and the TA granularity. Different numerologies are configured for at least two carriers, wherein the at least two carriers serve the terminal device and the terminal device supports multiple numerologies.

According to another aspect of the disclosure, it is provided a computer readable storage medium. The computer readable storage medium comprises instructions which when executed by at least one processor, cause the at least one processor to receive a time advance, TA, command from a network device; determine a TA granularity; and determine a TA value based at least partly on the TA command and the TA granularity. The TA granularity is determined by a numerology of multiple numerologies used by the terminal device. There is a correspondence between numerology and TA granularity.

According to another aspect of the disclosure, it is provided a computer readable storage medium. The computer readable storage medium comprises instructions which when executed by at least one processor, cause the at least one processor to receive a TA command from a network device; determine a TA granularity or range; and determine the TA value based at least partly on the TA command and the TA granularity or range, wherein different numerologies are configured for at least two carriers and/or at least two bandwidth parts (BWPs) in one carrier, wherein the at least two carriers and/or the at least two BWPs serve the terminal device and the terminal device supports at least one numerology.

According to another aspect of the disclosure, it is provided a computer readable storage medium. The computer readable storage medium comprises instructions which when executed by at least one processor, cause the at least one processor to determine a time advance, TA, value for a terminal device; determine a TA granularity for the terminal device; generate a TA command based at least partly on the TA value and the TA granularity; and send the TA command to the terminal device. Different numerologies are configured for at least two carriers. The at least two carriers serve the terminal device and the terminal device supports multiple numerologies.

According to another aspect of the disclosure, it is provided a computer readable storage medium. The computer readable storage medium comprises instructions which when executed by at least one processor, cause the at least one processor to determine a time advance, TA, value for a terminal device; determine a TA granularity for the terminal device; generate a TA command based on the TA value and the TA granularity; and send the TA command to the terminal device, wherein the TA granularity is determined by a numerology of multiple numerologies used by the terminal device, wherein there is a correspondence between numerology and TA granularity.

According to another aspect of the disclosure, it is provided a computer readable storage medium. The computer readable storage medium comprises instructions which when executed by at least one processor, cause the at least one processor to determine a time advance, TA, value for a terminal device; determine a TA granularity or range for the terminal device; generate a TA command based at least partly on the TA value and the TA granularity or range; and send the TA command to the terminal device, wherein different numerologies are configured for at least two carriers and/or at least two bandwidth parts (BWPs) in one carrier, wherein the at least two carriers and/or the at least two BWPs serve the terminal device and the terminal device supports at least one numerology.

According to another aspect of the disclosure, it is provided a method implemented in a communication system including a host computer, a base station and a user equipment. The method may comprise at the host computer, receiving user data originating from a transmission from a user equipment to a base station. The base station is operative to perform the method associated with network device according to any one of embodiments of present disclosure. The user equipment is operative to perform the method associated with user equipment according to any one of embodiments of present disclosure.

According to another aspect of the disclosure, it is provided a method implemented in a communication system including a host computer, a base station and a user equipment, the method comprising: at the host computer, initiating a transmission carrying user data to the user equipment via the base station. The base station is operative to perform the method associated with base station according to any one of embodiments of present disclosure. The user equipment is operative to perform the method associated with user equipment according to any one of embodiments of present disclosure.

According to another aspect of the disclosure, it is provided a communication system including a host computer comprising: a processing circuitry configured to provide user data; and a communication interface configured to receive user data originating from a transmission from a user equipment to a base station. The base station comprises a processor and a memory, the memory containing instructions executable by the processor, whereby the base station is operative to perform the method associated with base station according to any one of embodiments of present disclosure. The user equipment comprises a processor and a memory, the memory containing instructions executable by the processor, whereby the user equipment is operative to perform the method associated with user equipment according to any one of embodiments of present disclosure.

According to another aspect of the disclosure, it is provided a communication system including a host computer comprising: a processing circuitry configured to provide user data; and a communication interface configured to initiate a transmission carrying user data to a user equipment via a base station. The base station comprises a processor and a memory, the memory containing instructions executable by the processor, whereby the base station is operative to perform the method associated with base station according to any one of embodiments of present disclosure. The user equipment comprises a processor and a memory, the memory containing instructions executable by the processor, whereby the user equipment is operative to perform the method associated with user equipment according to any one of embodiments of present disclosure.

These and other objects, features and advantages of the disclosure will become apparent from the following detailed description of illustrative embodiments thereof, which are to be read in connection with the accompanying drawings.

DETAILED DESCRIPTION

Figure 1:
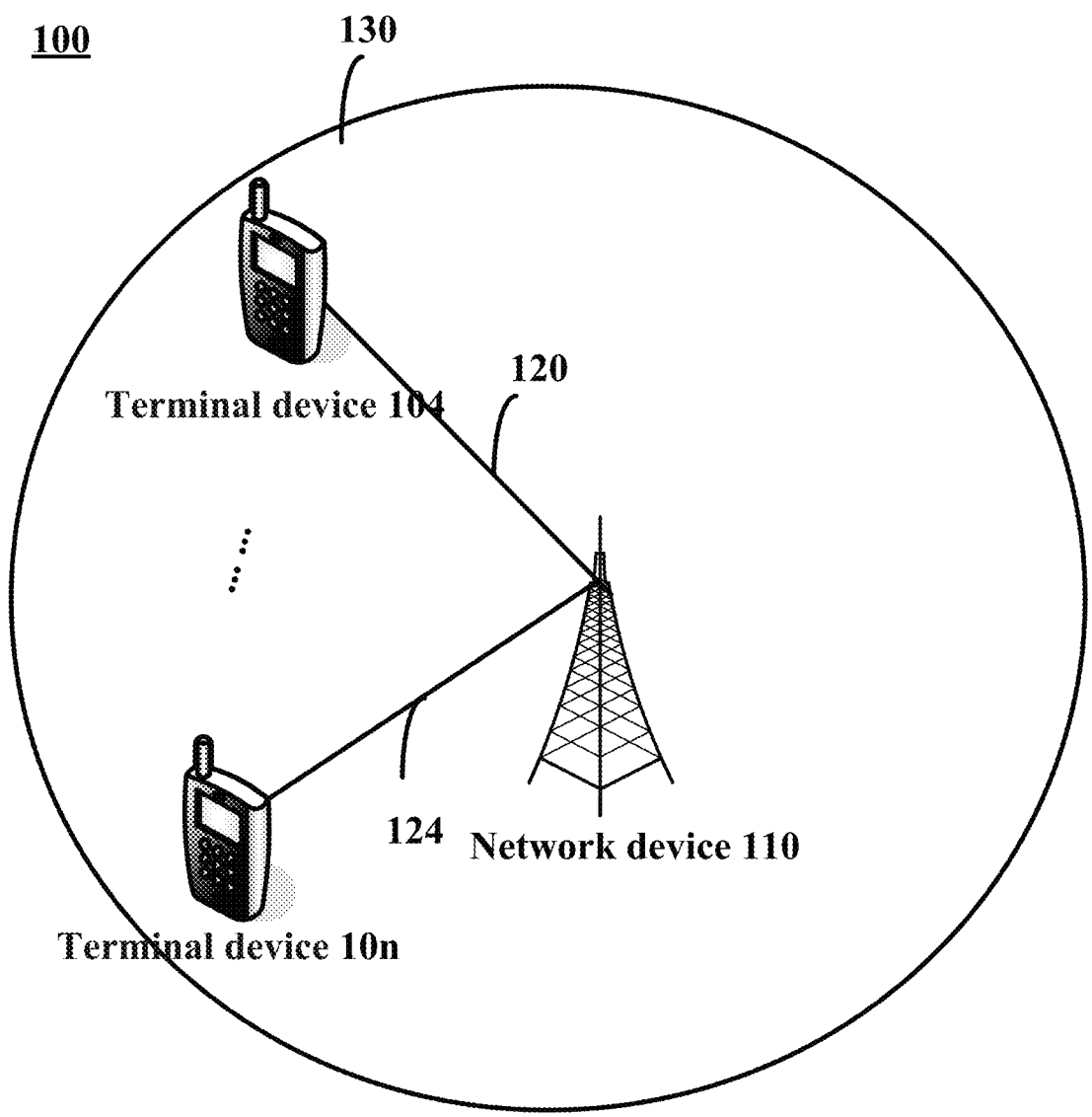
FIG. 1 depicts a schematic system, in which some embodiments of the present disclosure can be implemented.

For the purpose of explanation, details are set forth in the following description in order to provide a thorough understanding of the embodiments disclosed. It is apparent, however, to those skilled in the art that the embodiments may be implemented without these specific details or with an equivalent arrangement.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable, and/or other suitable the first generation (1G), the second generation (2G), 2.5G, 2.75G, the third generation (3G), the fourth generation (4G), 4.5G, the future fifth generation (5G) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (JOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Multiple numerology operation in the NR system may comprise two aspects:

Case scenario 1: Different numerologies can be configured for different carriers. For instance, small subcarrier spacing (SCS) may be applied for carriers of low frequency and large SCS may be applied for carrier of high frequency. For one given carrier frequency range, there may be more than one candidate numerology so that the network can select which numerology is to be applied for one carrier within the range considering the traffic quality of service (QoS) requirement and/or network dimension requirement. For one instance, if the network coverage is more a priority than transmission delay in air interface, the network can configure a small SCS for one carrier at low frequencies. For another instance, if radio access network (RAN) transmission delay is more a priority than the network coverage, the network can configure a large SCS for the carrier to get a short TTI duration. In addition, the bandwidth and transmission time interval (TTI) may be different for different carriers.

Figure 2:
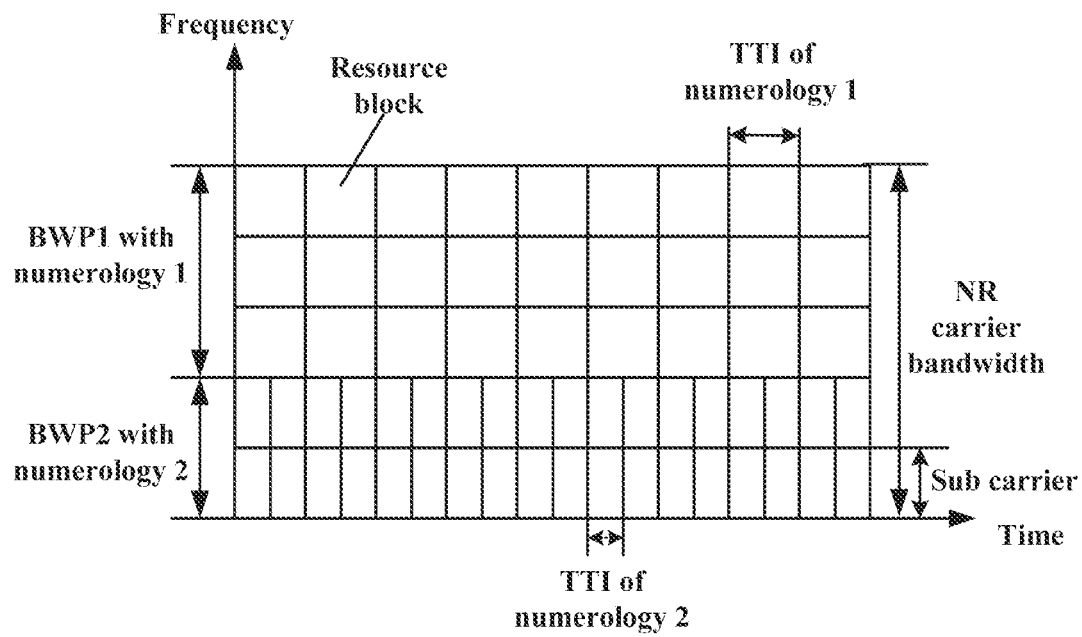
FIG. 2 shows an example of multiple BWP configurations in one carrier.

Case scenario 2: There can be multiple BandWidth Parts (BWPs) configured in one carrier and one UE can be configured with one or multiple BWPs. Different BWPs may be configured with different numerologies to meet different QoS requirements. FIG. 2 shows an example of multiple BWP configurations in one carrier. As shown in FIG. 2, there are two BWP configurations in one NR carrier, BWP1 with numerology 1 and BWP2 with numerology 2. For the BWP1 with numerology 1, TTI of numerology 1 is used, and for the BWP2 with numerology 2, TTI (transmission time interval) of numerology 2 is used. It is noted that the BWP configurations as shown in FIG. 2 are only exemplary and may be different in other embodiments.

The timing adjustment indication is specified in 3GPP TS 36.331-e20, the disclosure of which is incorporated by reference herein in its entirety. The timing adjustment indication indicates an initial $N_{TA}$ used for a TAG (timing advance group) The TA command for a TAG indicates the change of the uplink timing relative to the current uplink timing for the TAG as multiples of $16T_s$. The start timing of the random access preamble is specified in 3GPP TS 36.211, the disclosure of which is incorporated by reference herein in its entirety.

In the case of random access response (RAR), an 11-bit timing advance command TA for a TAG indicates $N_{TA}$ values by index values of $T_A=0, 1, 2, \ldots, 256$ if the UE is configured with a Secondary Cell Group (SCG), and $T_A=0, 1, 2, \ldots, 1282$ otherwise, wherein an amount of the time alignment for the TAG is given by $N_{TA}=T_A \times 16$.

In other cases, a 6-bit timing advance command (see 3GPP TS 36.321-e20, the disclosure of which is incorporated by reference herein in its entirety), $T_A$, for a TAG indicates adjustment of the current $N_{TA}$ value, $N_{TA,old}$, to the new $N_{TA}$ value, $N_{TA,new}$, by index values of $T_A=0, 1, 2, \ldots, 63$, where $N_{TA,new}=N_{TA,old}+(T_A-31)\times 16$. Herein, adjustment of $N_{TA}$ value by a positive or a negative amount indicates advancing or delaying the uplink transmission timing for the TAG by a given amount respectively. For LTE, the granularity is around 0.5208 us.

In 3GPP TS 36.321-e20, the Timing Advance Command MAC control element (CE) is identified by MAC Protocol Data Unit (PDU) subheader with LCID as specified in table 6.2.1-1 in 3GPP TS 36.321-e20.

Figure 3:
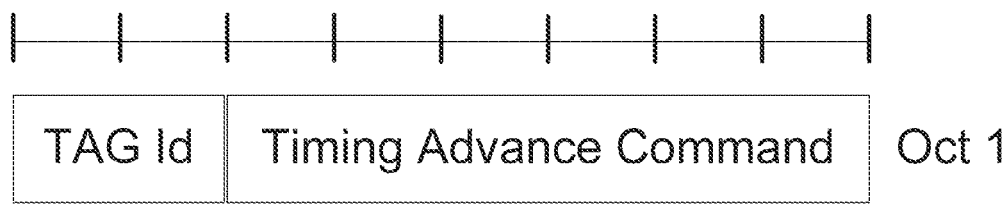
FIG. 3 is a diagram depicting Timing Advance Command MAC control element.

The Timing Advance Command MAC control element has a fixed size and consists of a single octet defined as in FIG. 3 which is copy of FIG. 6.1.3.5-1 of 3GPP TS 36.321-e20. The Timing Advance Command MAC control element comprises:

TAG Identity (TAG Id): This field indicates the TAG Identity of the addressed TAG. The TAG containing the SpCell has the TAG Identity 0. The length of the field is 2 bits;

Timing Advance Command: This field indicates the index value TA (0, 1, 2 . . . 63) used to control the amount of timing adjustment that MAC entity has to apply. The length of the field is 6 bits.

It is noted that LTE only supports a single numerology operation and a fixed TA adjustment configuration.

When a UE is configured with multiple numerologies, the SCS and Cyclic Prefix (CP) length of different numerology may be different. This means that the allowed timing error for uplink transmission is different when the uplink transmission changes from one numerology to another numerology.

If the same TA granularity (i.e. 0.52 us) as LTE is applied in a wireless system supporting multiple numerology operation, it may result in an inaccuracy problem for a numerology with shorter CP length. Accordingly, the fixed TA adjustment configuration used by LTE becomes unsuitable for a wireless system such as NR supporting multiple numerology operation. For example, the fixed TA adjustment configuration is unsuitable when higher SCS and lower CP length are applied.

Another issue is that the wireless system supporting multiple numerology operation is required to introduce a unified TA framework so that the frequent change of numerology doesn't affect stability of the timing advance management. In other words, the UE should not update the TA setting too often to simplify its management efforts.

The present disclosure proposes a solution for TA adjustment in a wireless system supporting multiple numerology operation, such as a NR system. It may overcome at least one of the drawbacks mentioned above, or it may not overcome any one of the drawbacks mentioned above. It is noted that though the embodiments are mainly described in the context of the NR system, they are not limited to this but can be applied to any suitable wireless system. In addition, it is noted that the embodiments can be applied to unlicensed channel operation and/or licensed channel operation.

Now some exemplary embodiments of the present disclosure will be described below with reference to the figures.

FIG. 1 depicts a schematic system, in which some embodiments of the present disclosure can be implemented. While this and other embodiments below are primarily discussed in the context of a NR system, it will be recognized by those of ordinary skill that the disclosure is not so limited. In fact, the various aspects of this disclosure are useful in any wireless network/system that can benefit from the embodiments as is described herein, such as TDMA, TD-SCDMA, OFDMA, SC-FDMA and other wireless networks supporting multiple numerology operation. The terms "network" and "system" are often used interchangeably. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc.

As shown in FIG. 1, the wireless system 100 comprises a network device 110 such as a cellular base station, for example a gNB in NR. The network device 110 may refer to a function element on the network side as compared to a terminal device or UE. For example, the network device 110 may comprise an eNB, a Home eNode B, a femto Base Station, a pico BS, gNB or any other node capable to serve terminal devices 104-10n in the system 100. It is well known that a cellular radio system may comprise a network of radio cells each served by a transmitting station, known as a cell site or base transceiver station. The radio network provides wireless communications service for a plurality of transceivers (in most cases mobile). The network of network devices working in collaboration allows for wireless service which is greater than the radio coverage provided by a single network device. The individual network device may be connected by another network (in many cases a wired network, not shown), which includes additional controllers for resource management and in some cases access to other network systems (such as the Internet) or metropolitan area networks (MANs). The circle 130 schematically indicates a coverage range of the network device 110.

As shown in FIG. 1, the system 100 may comprise one or more UEs or terminal devices 104-10n, each of which may operably communicate with the network device 110 such as a cellular base station through a wireless link, such as link 120 and 124. The terms "terminal device" and "UE" are often used interchangeably. The terminal devices 104-10n can be fixed or moveable. Terminal devices 104-10n may include, but not limited to, cellular telephones, smart phones, and computers, whether desktop, laptop, or otherwise, as well as mobile devices or terminals such as cellular network UEs, machine type communication devices, handheld computers, personal digital assistants (PDAs), wireless sensors, wearable devices, video cameras, set-top boxes, personal media devices, or any combinations of the foregoing, which may be provided with wireless communication functionality and run with any kind of operating system including, but not limited to, Windows, Linux, UNIX, Android, iOS and their variants.

In addition, though only one network device 110 is shown in FIG. 1, there may be two or more network devices such that some terminal devices are within the coverage range of first network device, some terminal devices are within the coverage range of second network device, and some terminal devices are at the border of the coverage ranges of two or more network devices, and so on. In the latter case, the terminal devices may receive signals from each of the two or more network devices.

Figure 4:
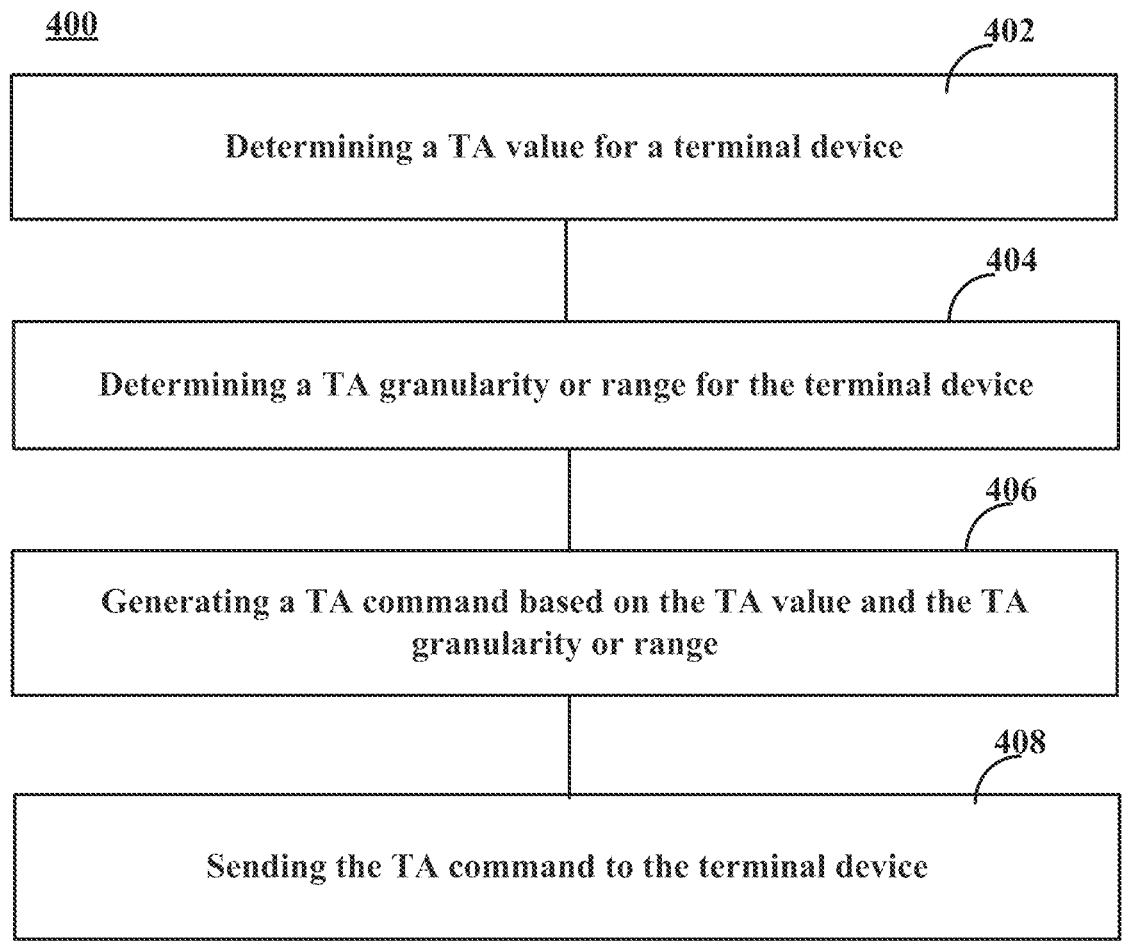
FIG. 4 is a flow chart depicting a method according to an embodiment of the present disclosure.

FIG. 4 is a flow chart depicting a method 400 for TA adjustment according to an embodiment of the present disclosure, which may be performed at an apparatus such as the network device 110 of FIG. 1. As such, the network device 110 may provide means for accomplishing various parts of the method 400 as well as means for accomplishing other processes in conjunction with other components.

As shown in FIG. 4, the method 400 may start at block 402 where the network device 110 determines a TA value for a terminal device, wherein different numerologies are configured for at least two carriers and/or at least two bandwidth parts (BWPs) in one carrier, wherein the at least two carriers and/or the at least two BWPs serve the terminal device and the terminal device supports at least one numerology. The network device 110 may determine the TA value for the terminal device by using any suitable existing or future developed technology. For example, the network device 110 may determine the TA value for the terminal device from an uplink signal received from the terminal device.

At block 404, the network device 110 determines a TA granularity or range for the terminal device. For example, the network device 110 may determine the TA granularity or range for the terminal device based on a predefined rule which is known by both the terminal device and the network device 110. As an example, the network device 110 may be preconfigured with a plurality of TA granularities or ranges each of which corresponds to a range of the subcarrier spacing, CP length or carrier frequency, then the network device 110 can determine the TA granularity according to one or multiple of subcarrier spacing, CP length and carrier frequency, and optionally send the TA granularity or range to the terminal device. As another example, a specific terminal device (for example, a fixed terminal device or a terminal device with a higher priority, etc) may have a predefined table which defines the correspondence between at least one of radio parameters (subcarrier spacing, cyclic prefix (CP) length and carrier frequency) and TA granularity or range, then the network device 110 may determine the TA granularity or range for the terminal device by looking up the table.

In an embodiment, the network device 110 may determine the TA granularity or range by at least one of a cyclic prefix (CP) length, a numerology and a carrier frequency used by the terminal device, wherein there is a correspondence between CP length and TA granularity or range, a correspondence between numerology and TA granularity or range, and a correspondence between carrier frequency and TA granularity or range, wherein the correspondences are preconfigured in the network device and/or the correspondences are preconfigured in the terminal device or signaled to the terminal device.

Table 1 shows a correspondence between CP length and TA granularity or range. Both the network device 110 and the terminal device may determine the TA granularity or range by looking up the table 1 according to the CP length of the operating numerology. A short CP length is mapped to a small TA granularity or range for timing adjustment to maintain timing errors within a given CP range. In the case of multiple numerologies configured for one carrier or for carrier aggregation (CA), the shortest CP may be used as reference numerology. Then the reference numerology is used as entry to look up the table. Alternatively, the network device 110 indicates which CP should be used for TA granularity selection. It is noted that Table 1 is only exemplary and may be different in other embodiments.

TABLE 1

| CP length | TA granularity or range |
|---|---|
| CP length >= y | Large time granularity (e.g. 0.52 us) or large time range |
| y > CP length >= x | Medium time granularity (e.g. 0.26 us) or medium time range |
| CP length < x | Small time granularity (<0.26 us) or small time range |

Table 2 shows a correspondence between carrier frequency and TA granularity or range. Both the network device 110 and the terminal device may determine the TA granularity or range by looking up the table 2 according to the operating carrier frequency. For example, a carrier with high frequency can use a numerology associated with a large SCS, correspondingly a small CP length is accompanied, so a carrier of high frequency may map to a small TA granularity. In the case of CA, the highest carrier frequency may determine the TA selection. Alternatively, the network device 110 indicates which numerology/carrier frequency should be used for TA granularity selection. It is noted that Table 2 is only exemplary and may be different in other embodiments.

TABLE 2

| Carrier frequency range | TA granularity or range |
|---|---|
| Freq < 6 GHz | Large time granularity (e.g. 0.52 us) or large time range |
| 30 GHz >= Freq > 6 GHz | Medium time granularity (e.g. 0.26 us) or medium time range |
| Freq > 30 GHz | Small time granularity (<0.26 us) or small time range |

Table 3 shows a correspondence between numerology (such as SCS and BWP) and TA granularity or range. Both the network device 110 and the terminal device may determine the TA granularity or range by looking up the table according to the operating numerology. For example, the higher SCS of a numerology, the smaller CP length of the numerology tends to use. Based on this mapping relationship, the correspondence of table can be created. In the case of multiple numerologies configured for one carrier or for CA, the widest subcarrier spacing may be used. Alternatively, the network device 110 indicates which subcarrier spacing should be used for TA granularity selection. It is noted that Table 3 is only exemplary and may be different in other embodiments.

TABLE 3

| Numerology | TA granularity or range |
|---|---|
| SCS = 15 kHz | Large time granularity (e.g. 0.52 us) or large time range |
| SCS = 30 kHz | Medium time granularity (e.g. 0.26 us) or medium time range |
| SCS > 30 kHz | Small time granularity (<0.26 us) or small time range |

In an embodiment, the carrier comprises a plurality of BWPs, each BWP is associated with a numerology, and the carrier has a reference numerology, the network device 110 determines the TA granularity or range based on the reference numerology and the reference numerology is a numerology with the shortest CP length or widest sub-carrier spacing. For example, for a NR UE supporting multiple numerologies, each numerology may be mapped with a separate BWP, therefore, a carrier may comprise multiple BWPs and each is associated with a distinct numerology, or the numerology is configured per carrier. For the former case, a reference numerology may be defined, and based on which the UE can derive the TA granularity or range by looking up a table such as Table 3. The reference numerology can be determined among all numerologies irrespective of their associated BWPs are active or inactive, or consider only active numerologies. The reference numerology/CP can be the one with shortest CP, which requires the finest TA granularities. For the latter case where each carrier is configured with a different numerology, the UE determines the TA granularity for each carrier separately or in a similar way as for the multiple numerologies on the same carrier (BWP above) (i.e. on TA granularity based on a reference numerology).

In an embodiment, a reference numerology assigned for terminal devices under an idle state is same in a cell. For example, different reference numerology/CP may be defined separately for the UE under RRC_IDLE and RRC_CONNECTED states. The numerology assigned for UEs under RRC_IDLE could be same in the cell. For example, UEs may obtain their initial TA values via RAR message, based on the reference numerology/CP. When UEs switch up to RRC_CONNECTED state, the TA value can be updated whenever the reference numerology changes.

In an embodiment, after determining the TA granularity or range, the network device 110 sends a message containing the TA granularity or range to the terminal device. For example, the message can be sent together with a TA command or any other suitable message. Then the terminal device can determine the TA granularity or range from the message.

Turn to FIG. 4, at block 406, the network device 110 generates a TA command based on the TA value and the TA granularity or range. For example, TA command can comprise a field indicating an index value associated with the TA granularity or range used to control the amount of timing adjustment. In this case, the network device 110 may generate a TA command comprising the index value. In another embodiment where the TA command comprises the index value and TA granularity or range, the network device 110 may generate a TA command comprising the index value and TA granularity or range. It is noted that the TA command may comprise any other suitable fields such as TAG.

In an embodiment, a format of the TA command is same as a format of the TA command used in a wireless network supporting single numerology operation. For example, the format of TA command in NR may be the same as ones used in LTE, i.e, 11-bit TA command in RAR, and 6-bit TA command in MAC CE. The bits of the field of TA command may be not fully occupied in some cases. The maintenance of TA is simple in this case, since all numerologies/CP lengths use the same format as ones used in a wireless network supporting single numerology operation such as LTE.

In another embodiment, the format of the TA command is different from the format of the TA command used in a wireless network supporting single numerology operation such as LTE. Different format is designed to carry the TA value for different TA granularity or range requirements. For small time granularity, more bits are needed to ensure a range sufficient for time adjustment.

Figure 5:
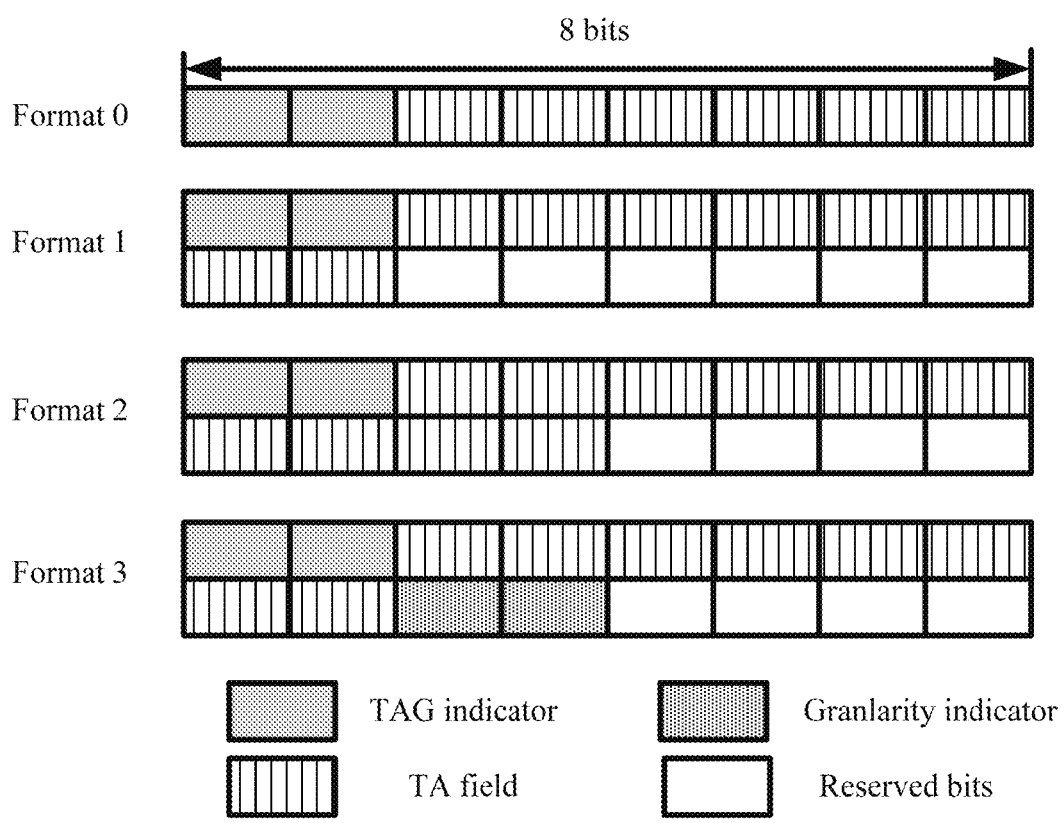
FIG. 5 shows four formats for TA command signaled in MAC CE according to an embodiment of the present disclosure.

FIG. 5 shows four formats for TA command signaled in MAC CE. For format 0,1,2, a predefined mapping between the TA granularity or range and the MAC CE format can be stored in both the UE and the network device 110. Table 4 shows one mapping example between the TA granularity or range and the MAC CE format.

TABLE 4

| Format | TA granularity or range |
|---|---|
| Format 0 | Large time granularity (e.g. 0.52 us) or large time range |
| Format 1 | Medium time granularity (e.g. 0.26 us) or medium time range |
| Format 2 | Small time granularity (<0.26 us) or small time range |

Format 3 comprises an indicator of the TA granularity or range. In this case, the network device 110 may indicate the TA granularity or range in the MAC CE together with the TA to the terminal device such that the terminal device can directly determine the TA granularity or range from the received TA command with format 3. It is noted that the above formats are only exemplary and may be different in other embodiments. In addition, any other suitable format of the TA command may be designed for other messages such as RAR.

In an embodiment, the format of the TA command changes in relation to the TA command field length change as shown in above formats 0-3. It is noted that the above formats are only exemplary and may be different in other embodiments.

In an embodiment, there is a correspondence between the format of the TA command and the TA granularity or range, and the network device 110 can determine the format of the TA command based on the TA granularity or range. For example, the network device 110 can determine the TA granularity or range for the terminal device as described above, then the network device 110 can determine the format of the TA command based on the TA granularity or range, for example by looking up a table such as Table 4 containing the correspondence between the format of the TA command and the TA granularity or range.

Turning to FIG. 4, at block 408, the network device 110 sends the TA command to the terminal device. For example, the network device 110 may send the TA command in RAR or MAC CE to the terminal device. Alternatively, the network device 110 may send the TA command in other suitable messages to the terminal device.

In an embodiment, the TA command is sent together with uplink grant or a medium access control (MAC) command associated with uplink grant, wherein the TA granularity or range is determined based on a numerology used for the UL grant or the numerology of PUSCH scheduled by the UL grant. For example, the TA granularity or range is defined by the numerology used in the uplink grant transmitted together with the TA command. This embodiment may be suitable for an case where the TA command is transmitted as a Layer 1 indication by the DCI (Downlink Control Information). Here, a DCI for uplink grant could then contain a field for TA command, where the numerology used for this UL grant gives the granularity for the TA command. For example, with a SCS of 15 kHz in the UL grant, then the TA granularity is 0.52 microseconds. If the SCS is 30 kHz, then the TA granularity is 0.26 microseconds. This embodiment may be suitable for an case where the TA command is transmitted as a MAC command and the MAC command is associated with a specific UL grant.

Figure 6A:
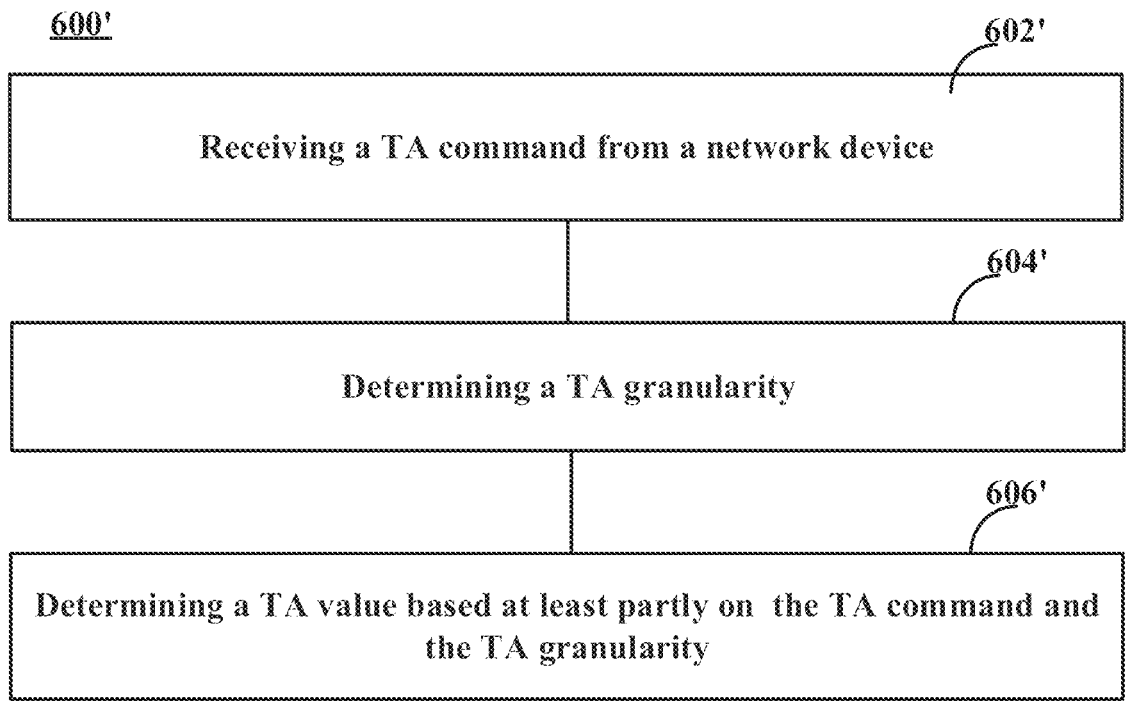
FIG. 6a is flow chart depicting a method according to an embodiment of the present disclosure.

FIG. 6a is flow chart depicting a method 600' for TA adjustment according to an embodiment of the present disclosure, which may be performed at an apparatus such as terminal devices 104-10n of FIG. 1. As such, terminal device 104-10n may provide means for accomplishing various parts of the method 600' as well as means for accomplishing other processes in conjunction with other components. For some parts which have been described in the above embodiments, detailed description thereof is omitted here for brevity.

As shown in FIG. 6a, the method 600' may start at block 602' where terminal device 104 receives a TA command from a network device.

In an embodiment, different numerologies are configured for at least two carriers, wherein the at least two carriers serve the terminal device and the terminal device supports multiple numerologies. The TA command may be included in any suitable messages such as RAR or MAC CE. Alternatively, the TA command may be included in other suitable messages.

At block 604', the terminal device 104 determines a TA granularity. For example, the terminal device 104 may determine the TA granularity for the terminal device based on a predefined rule which is known by both the terminal device 104 and the network device 110. As an example, a specific terminal device (for example, a fixed terminal device or a terminal device with a higher priority, etc) may have a predefined TA granularity, then the terminal device 104 may determine the TA granularity for the terminal device by the predefined TA granularity.

In an embodiment, the TA granularity is determined by a numerology of multiple numerologies used by the terminal device. There is a correspondence between numerology and TA granularity.

In an embodiment, the terminal device 104 may determine the TA granularity by at least one of a cyclic prefix (CP) length, a numerology and a carrier frequency used by the terminal device, wherein there is a correspondence between CP length and TA granularity, a correspondence between numerology and TA granularity, and a correspondence between carrier frequency and TA granularity, wherein the correspondences are preconfigured in the network device and/or the correspondences are preconfigured in the terminal device or signaled to the terminal device. The determining procedure in the terminal device 104 is similar to that in the network device 110 which has been described above with reference to Tables 1-3, therefore detailed description about it is omitted here for brevity.

In an embodiment, the carrier comprises a plurality of BWPs, each BWP is associated with a numerology, and the carrier has a reference numerology, the terminal device 104 determines the TA granularity based on the reference numerology and the reference numerology is a numerology with the shortest CP length. The determining procedure in the terminal device 104 is similar to that in the network device 110 which has been described above, therefore detailed description about it is omitted here for brevity.

In an embodiment, a reference numerology assigned for terminal devices under an idle state is same in a cell. For example, different reference numerology/CP may be defined separately for the UE under RRC_IDLE and RRC_CONNECTED states. The numerology assigned for UEs under RRC_IDLE could be same in the cell. For example, UEs may obtain their initial TA values via RAR message, based on the reference numerology/CP. When UEs switch up to RRC_CONNECTED state, the TA value can be updated whenever the reference numerology changes.

In an embodiment, the terminal device 104 receives a message containing the TA granularity from the network device. For example, the message can be received together with a TA command or any other suitable message. In this case, the terminal device 104 determines the TA granularity from the received TA granularity.

Turn to FIG. 6a', at block 606', the terminal device 104 determines a TA value based at least partly on the TA command and the TA granularity. For example, when the TA granularity is not changed, the terminal device 104 may determine the TA value by using similar approach as LTE.

In another embodiment, the terminal device 104 may determine the TA value by updating a previous TA value considering the difference of between an old TA granularity and a new TA granularity; calculating a TA compensation based on the new TA command and the new TA granularity; and determining the TA value based on the updated previous TA value and the TA compensation. For example, the terminal device 104 updates the current $N_{TA}$ value, $N_{TA,old}$, and the new $N_{TA}$ value, $N_{TA,new}$ together. $N_{TA,old}$ is updated since it was calculated with the old TA granularity. As a base, it is recalculated with the new TA granularity and the old TA value. As a further step, $N_{TA,new}$ is adjusted by summing the updated $N_{TA,old}$ and the TA compensation. The TA compensation is calculated with the recent received TA index and the new TA granularity.

Figure 6B:
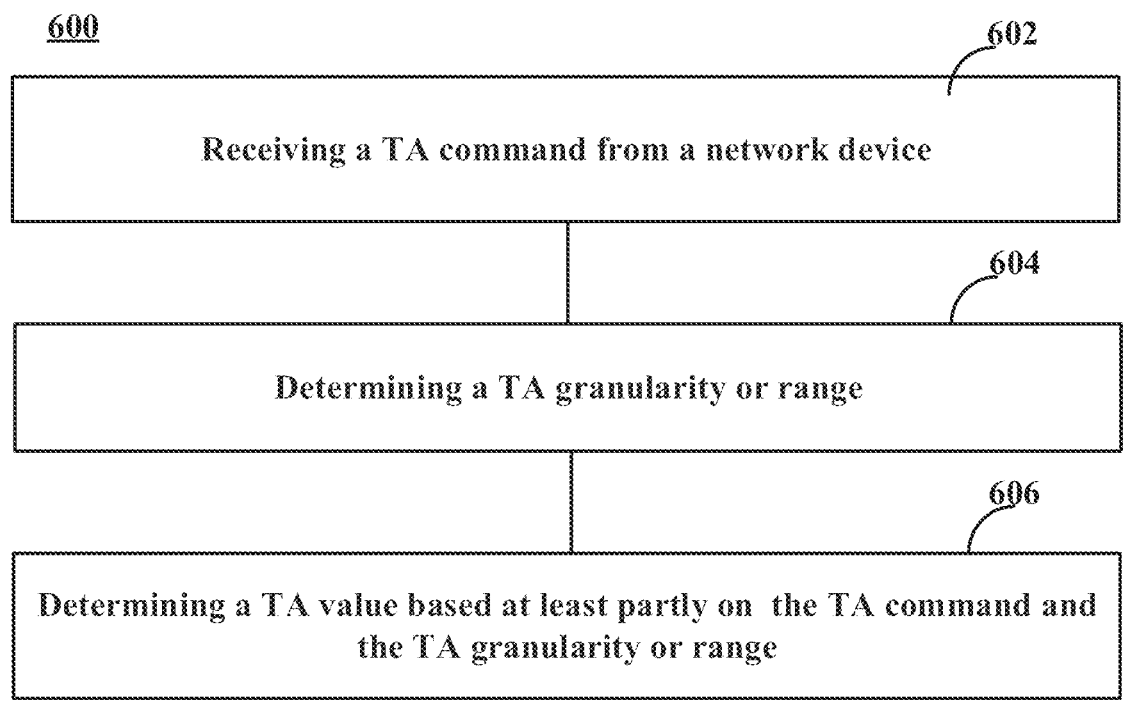
FIG. 6b is flow chart depicting a method according to another embodiment of the present disclosure.

FIG. 6b is flow chart depicting a method 600 for TA adjustment according to an embodiment of the present disclosure, which may be performed at an apparatus such as terminal devices 104-10n of FIG. 1. As such, terminal device 104-10n may provide means for accomplishing various parts of the method 600 as well as means for accomplishing other processes in conjunction with other components. For some parts which have been described in the above embodiments, detailed description thereof is omitted here for brevity.

As shown in FIG. 6b, the method 600 may start at block 602 where terminal device 104 receives a TA command from a network device, wherein different numerologies are configured for at least two carriers and/or at least two bandwidth parts (BWPs) in one carrier as described above, wherein the at least two carriers and/or the at least two BWPs serve the terminal device and the terminal device supports at least one numerology. The TA command may be included in any suitable messages such as RAR or MAC CE. Alternatively, the TA command may be included in other suitable messages.

At block 604, the terminal device 104 determines a TA granularity or range. For example, the terminal device 104 may determine the TA granularity or range for the terminal device based on a predefined rule which is known by both the terminal device 104 and the network device 110. As an example, a specific terminal device (for example, a fixed terminal device or a terminal device with a higher priority, etc) may have a predefined TA granularity or range, then the terminal device 104 may determine the TA granularity or range for the terminal device by the predefined TA granularity or range.

In an embodiment, the terminal device 104 may determine the TA granularity or range by at least one of a cyclic prefix (CP) length, a numerology and a carrier frequency used by the terminal device, wherein there is a correspondence between CP length and TA granularity or range, a correspondence between numerology and TA granularity or range, and a correspondence between carrier frequency and TA granularity or range, wherein the correspondences are preconfigured in the network device and/or the correspondences are preconfigured in the terminal device or signaled to the terminal device. The determining procedure in the terminal device 104 is similar to that in the network device 110 which has been described above with reference to Tables 1-3, therefore detailed description about it is omitted here for brevity.

In an embodiment, the carrier comprises a plurality of BWPs, each BWP is associated with a numerology, and the carrier has a reference numerology, the terminal device 104 determines the TA granularity or range based on the reference numerology and the reference numerology is a numerology with the shortest CP length. The determining procedure in the terminal device 104 is similar to that in the network device 110 which has been described above, therefore detailed description about it is omitted here for brevity.

In an embodiment, a reference numerology assigned for terminal devices under an idle state is same in a cell. For example, different reference numerology/CP may be defined separately for the UE under RRC_IDLE and RRC_CONNECTED states. The numerology assigned for UEs under RRC_IDLE could be same in the cell. For example, UEs may obtain their initial TA values via RAR message, based on the reference numerology/CP. When UEs switch up to RRC_CONNECTED state, the TA value can be updated whenever the reference numerology changes.

In an embodiment, the terminal device 104 receives a message containing the TA granularity or range from the network device. For example, the message can be received together with a TA command or any other suitable message. In this case, the terminal device 104 determines the TA granularity or range from the received TA granularity or range.

Turn to FIG. 6, at block 606, the terminal device 104 determines a TA value based on one or more of the TA command and the TA granularity or range. For example, when the TA granularity or range is not changed, the terminal device 104 may determine the TA value by using similar approach as LTE.

In another embodiment, the terminal device 104 may determine the TA value by updating a previous TA value considering the difference of between an old TA granularity or range and a new TA granularity or range; calculating a TA compensation based on the new TA command and the new TA granularity or range; and determining the TA value based on the updated previous TA value and the TA compensation. For example, the terminal device 104 updates the current $N_{TA}$ value, $N_{TA,old}$, and the new $N_{TA}$ value, $N_{TA,new}$ together. $N_{TA,old}$ is updated since it was calculated with the old TA granularity or range. As a base, it is recalculated with the new TA granularity and the old TA value. As a further step, $N_{TA,new}$ is adjusted by summing the updated $N_{TA,old}$ and the TA compensation. The TA compensation is calculated with the recent received TA index and the new TA granularity.

In an embodiment, a format of the TA command is same as a format of the TA command used in a wireless network supporting single numerology operation. For example, the format of TA command in NR may be the same as ones used in LTE, i.e, 11-bit TA command in RAR, and 6-bit TA command in MAC CE. The bits of the field of TA command may be not fully occupied in some cases. The maintenance of TA is simple in this case, since all numerologies/CP lengths use the same format as ones used in a wireless network supporting single numerology operation such as LTE.

In another embodiment, the format of the TA command is different from the format of the TA command used in a wireless network supporting single numerology operation. Different format is designed to carry the TA value for different TA granularity requirements. For small time granularity, more bits are needed to ensure an enough range for time adjustment. In an embodiment, the format of the TA command changes in relation to the TA command field length change. The formats have been described above, therefore detailed description about them is omitted here for brevity.

In an embodiment, there is a correspondence between the format of the TA command and the TA granularity or range, and the terminal device 104 can determine the format of the TA command based on the TA granularity or range. For example, the terminal device 104 can determine the TA granularity or range as described above, then the terminal device 104 can determine the format of the TA command based on the TA granularity or range, for example by looking up a table such as Table 4 containing the correspondence between the format of the TA command and the TA granularity or range.

In an embodiment, the terminal device 104 receives the TA command together with uplink grant or a medium access control (MAC) command associated with uplink grant, wherein the TA granularity or range is determined based on a numerology used for the UL grant or the numerology of PUSCH scheduled by the UL grant. For example, the TA granularity or range is defined by the numerology used in the uplink grant transmitted together with the TA command. This embodiment would be useful if the TA command is transmitted as a Layer 1 indication by the DCI (Downlink Control Information). Here, a DCI for uplink grant could then contain a field for TA command, where the numerology used for this UL grant gives the granularity for the TA command. For example, with a SCS of 15 kHz in the UL grant, then the TA granularity is 0.52 microseconds. If the SCS is 30 kHz, then the TA granularity is 0.26 microseconds. This embodiment may be suitable for an case where the TA command is transmitted as a MAC command and the MAC command is associated with a specific UL grant.

Figure 7:
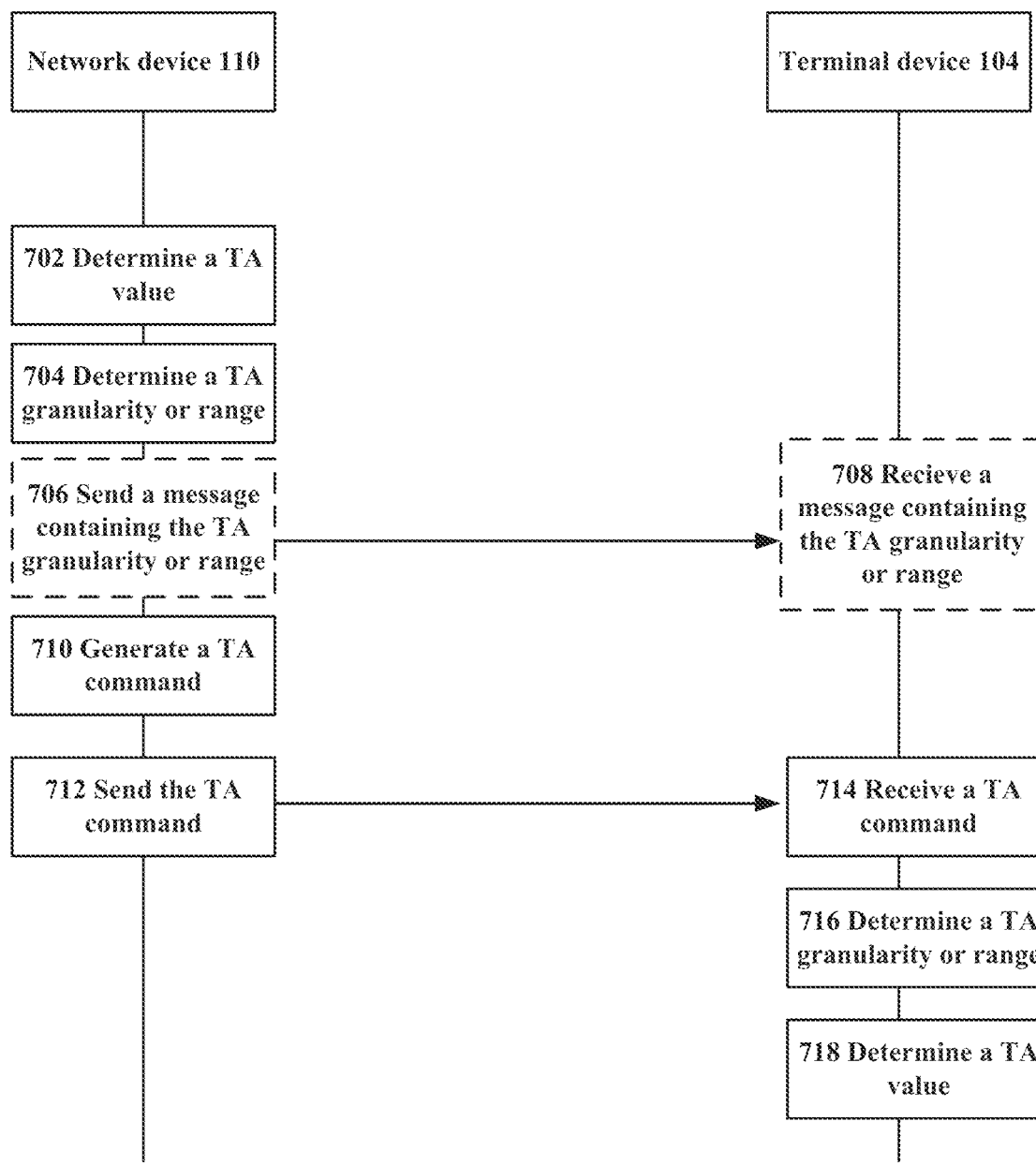
FIG. 7 is a flowchart illustrating methods on both a network device's side and a terminal device's side according to an embodiment of the disclosure.

FIG. 7 is a flowchart illustrating methods for TA adjustment on both a network device's side and a terminal device's side according to an embodiment of the disclosure. For some parts which have been described in the above embodiments, detailed description thereof is omitted here for brevity.

At block 702, the network device 110 determines a TA value for a terminal device 104, wherein different numerologies are configured for at least two carriers and/or at least two bandwidth parts (BWPs) in one carrier, wherein the at least two carriers and/or the at least two BWPs serve the terminal device and the terminal device supports at least one numerology.

At block 704, the network device 110 determines a TA granularity or range for the terminal device 104.

In an embodiment, the TA granularity or range is determined by at least one of a cyclic prefix (CP) length, a numerology and a carrier frequency used by the terminal device, wherein there is a correspondence between CP length and TA granularity or range, a correspondence between numerology and TA granularity or range, and a correspondence between carrier frequency and TA granularity or range, wherein the correspondences are preconfigured in the network device and/or the correspondences are preconfigured in the terminal device or signaled to the terminal device.

In an embodiment, the carrier comprises a plurality of BWPs, each BWP is associated with a numerology, and the carrier has a reference numerology, wherein the TA granularity or range is determined based on the reference numerology and the reference numerology is a numerology with the shortest CP length.

In an embodiment, a reference numerology assigned for terminal devices under an idle state is same in a cell.

Optionally, at block 706, the network device 110 sends a message containing the TA granularity or range to the terminal device 104.

Optionally, at block 708, the terminal device 104 receives a message containing the TA granularity or range.

At block 710, the network device 110 generates a TA command based on the TA value and the TA granularity or range.

In an embodiment, a format of the TA command is same as a format of the TA command used in a wireless network supporting single numerology operation. In another embodiment, the format of the TA command is different from a format of the TA command used in a wireless network supporting single numerology operation.

In an embodiment, the format of the TA command changes in relation to the TA command field length change.

In an embodiment, when there is a correspondence between the format of the TA command and the TA granularity or range, the network device 110 determines the format of the TA command based on the TA granularity or range at block 710.

In an embodiment, the format of the TA command comprises an indicator of the TA granularity or range.

At block 712, the network device 110 sends the TA command to the terminal device 104. In an embodiment, the TA command is sent together with uplink grant or a medium access control (MAC) command associated with uplink grant, wherein the TA granularity or range is determined based on a numerology used for the UL grant or the numerology of PUSCH scheduled by the UL grant.

At block 714, the terminal device 104 receives a TA command from the network device 110. In an embodiment, the TA command is received together with uplink grant or a medium access control (MAC) command associated with uplink grant, wherein the TA granularity or range is determined based on a numerology used for the UL grant or the numerology of PUSCH scheduled by the UL grant.

At block 716, the terminal device 104 determines a TA granularity or range.

In an embodiment, the TA granularity or range is determined by one or more of a cyclic prefix (CP) length, a numerology and a carrier frequency used by the terminal device, wherein there is a correspondence between CP length and TA granularity or range, a correspondence between numerology and TA granularity or range, and a correspondence between carrier frequency and TA granularity or range, wherein the correspondences are preconfigured in the network device and/or the correspondences are preconfigured in the terminal device or signaled to the terminal device.

In an embodiment, the carrier comprises a plurality of BWPs, each BWP is associated with a numerology, and the carrier has a reference numerology, wherein the TA granularity or range is determined based on the reference numerology and the reference numerology is a numerology with the shortest CP length.

In an embodiment, a reference numerology assigned for terminal devices under an idle state is same in a cell.

At block 718, the terminal device 104 determines a TA value based on at least partly on the TA command and the TA granularity or range. In an embodiment, the terminal device 104 determines a TA granularity or range by updating a previous TA value considering the difference of between an old TA granularity or range and a new TA granularity or range; calculating a TA compensation based on the new TA command and the new TA granularity or range; and determining the TA value based on the updated previous TA value and the TA compensation.

In an embodiment, there is a correspondence between the format of the TA command and the TA granularity or range, the terminal device 104 determines the format of the TA command based on the TA granularity or range.

Figure 8:
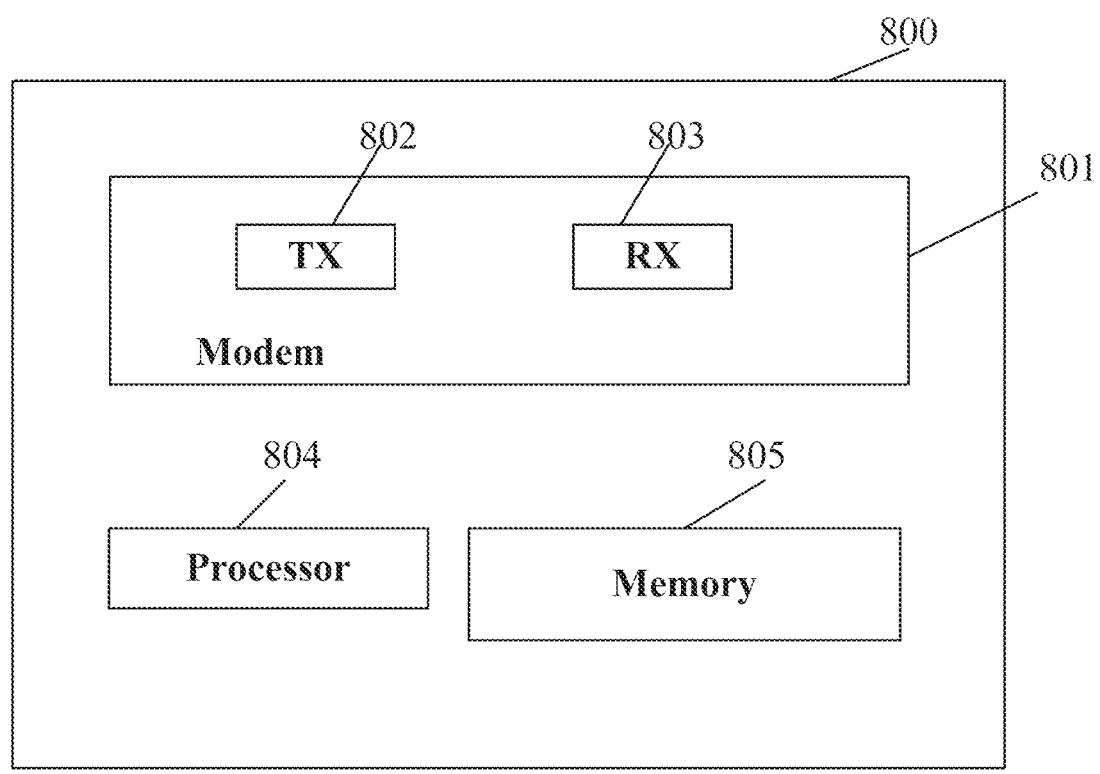
FIG. 8 is a block diagram illustrating a network device according to an embodiment of the disclosure.

FIG. 8 depicts a network device 800 capable of implementing the method for TA adjustment as described above. As shown in FIG. 8, the network device 800 comprises a processing device 804, a memory 805, and a radio modem subsystem 801 in operative communication with the processor 804. The radio modem subsystem 801 comprises at least one transmitter 802 and at least one receiver 803. While only one processor is illustrated in FIG. 8, the processing device 804 may comprises a plurality of processors or multi-core processor(s). Additionally, the processing device 804 may also comprise cache to facilitate processing operations.

Computer-executable instructions can be loaded in the memory 805 and, when executed by the processing device 804, cause the network device 800 to implement the above-described methods for TA adjustment. In particular, the computer-executable instructions can cause the network device 800 to determine a TA value for a terminal device; determine a TA granularity or range for the terminal device; generate a TA command based at least partly on the TA value and the TA granularity or range; and send the TA command to the terminal device.

In an embodiment, different numerologies are configured for at least two carriers, wherein the at least two carriers serve the terminal device and the terminal device supports multiple numerologies.

In an embodiment, the TA granularity is determined by a numerology of multiple numerologies used by the terminal device. There is a correspondence between numerology and TA granularity.

In an embodiment, different numerologies are configured for at least two carriers and/or at least two bandwidth parts, BWPs, in one carrier, wherein the at least two carriers and/or the at least two BWPs serve the terminal device and the terminal device supports at least one numerology.

In an embodiment, the TA granularity or range is determined by at least one of a cyclic prefix (CP) length, a numerology and a carrier frequency used by the terminal device, wherein there is a correspondence between CP length and TA granularity or range, a correspondence between numerology and TA granularity or range, and a correspondence between carrier frequency and TA granularity or range, wherein the correspondences are preconfigured in the network device and/or the correspondences are preconfigured in the terminal device or signaled to the terminal device.

In an embodiment, the computer-executable instructions can cause the network device 800 to send a message containing the TA granularity or range to the terminal device.

In an embodiment, the carrier comprises a plurality of BWPs, each BWP is associated with a numerology, and the carrier has a reference numerology, wherein the TA granularity or range is determined based on the reference numerology and the reference numerology is a numerology with the shortest CP length.

In an embodiment, a reference numerology assigned for terminal devices under an idle state is same in a cell.

In an embodiment, a format of the TA command is same as a format of the TA command used in a wireless network supporting single numerology operation.

In an embodiment, a format of the TA command is different from a format of the TA command used in a wireless network supporting single numerology operation.

In an embodiment, the format of the TA command changes in relation to the TA command field length change.

In an embodiment, there is a correspondence between the format of the TA command and the TA granularity or range, the computer-executable instructions can cause the network device 800 to determine the format of the TA command based on the TA granularity or range.

In an embodiment, the format of the TA command comprises an indicator of the TA granularity or range.

In an embodiment, the TA command is sent together with uplink grant or a medium access control (MAC) command associated with uplink grant, wherein the TA granularity or range is determined based on a numerology used for the UL grant or the numerology of PUSCH scheduled by the UL grant.

Figure 9:
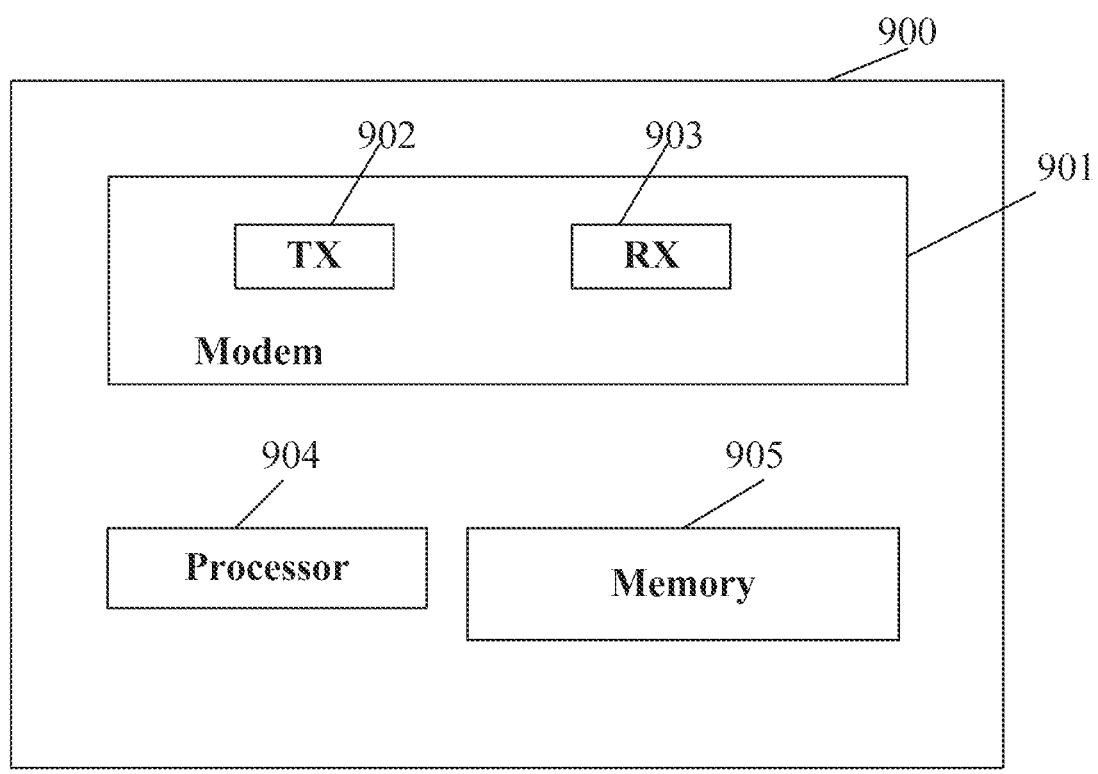
FIG. 9 is a block diagram illustrating a terminal device according to an embodiment of the disclosure.

FIG. 9 depicts a terminal device 900 capable of implementing the methods for TA adjustment as described above. As shown in FIG. 9, the terminal device 900 comprises a processing device 904, a memory 905, and a radio modem subsystem 901 in operative communication with the processor 904. The radio modem subsystem 901 comprises at least one transmitter 902 and at least one receiver 903. While only one processor is illustrated in FIG. 9, the processing device 904 may comprises a plurality of processors or multi-core processor(s). Additionally, the processing device 904 may also comprise cache to facilitate processing operations.

Computer-executable instructions can be loaded in the memory 905 and, when executed by the processing device 904, cause the terminal device 900 to implement the above-described methods for TA adjustment. In particular, the computer-executable instructions can cause the terminal device 900 to receive a TA command from a network device; determine a TA granularity or range; and determine a TA value based on at least partly on the TA command and the TA granularity or range.

In an embodiment, different numerologies are configured for at least two carriers, wherein the at least two carriers serve the terminal device and the terminal device supports multiple numerologies.

In an embodiment, the TA granularity is determined by a numerology of multiple numerologies used by the terminal device. There is a correspondence between numerology and TA granularity.

In an embodiment, different numerologies are configured for at least two carriers and/or at least two bandwidth parts, BWPs, in one carrier, wherein the at least two carriers and/or the at least two BWPs serve the terminal device and the terminal device supports at least one numerology.

In an embodiment, the TA granularity or range is determined by one or more of a cyclic prefix (CP) length, a numerology and a carrier frequency used by the terminal device, wherein there is a correspondence between CP length and TA granularity or range, a correspondence between numerology and TA granularity or range, and a correspondence between carrier frequency and TA granularity or range, wherein the correspondences are preconfigured in the network device and/or the correspondences are pre-configured in the terminal device or signaled to the terminal device.

In an embodiment, the computer-executable instructions can cause the terminal device 900 to receive a message containing the TA granularity or range from the network device.

In an embodiment, the carrier comprises a plurality of BWPs, each BWP is associated with a numerology, and the carrier has a reference numerology, wherein the TA granularity or range is determined based on the reference numerology and the reference numerology is a numerology with the shortest CP length.

In an embodiment, a reference numerology assigned for terminal devices under an idle state is same in a cell.

In an embodiment, the computer-executable instructions can cause the terminal device 900 to update a previous TA value considering the difference of between an old TA granularity or range and a new TA granularity or range; calculate a TA compensation based on the new TA command and the new TA granularity or range; and determine the TA value based on the updated TA value and the TA compensation.

In an embodiment, a format of the TA command is same as a format of the TA command used in a wireless network supporting single numerology operation.

In an embodiment, a format of the TA command is different from a format of the TA command used in a wireless network supporting single numerology operation.

In an embodiment, the format of the TA command changes in relation to the TA command field length change.

In an embodiment, there is a correspondence between the format of the TA command and the TA granularity or range, the method further comprises determining the format of the TA command based on the TA granularity or range.

In an embodiment, the format of the TA command comprises an indicator of the TA granularity or range.

In an embodiment, the TA command is received together with uplink grant or a medium access control (MAC) command associated with uplink grant, wherein the TA granularity or range is determined based on a numerology used for the UL grant or the numerology of PUSCH scheduled by the UL grant.

According to an aspect of the disclosure it is provided a computer program product comprising at least one non-transitory computer-readable storage medium having computer-executable program instructions stored therein, the computer-executable instructions being configured to, when being executed, cause a network device to operate as described above.

According to an aspect of the disclosure it is provided a computer program product comprising at least one non-transitory computer-readable storage medium having computer-executable program instructions stored therein, the computer-executable instructions being configured to, when being executed, cause a terminal device to operate as described above.

Figure 10:
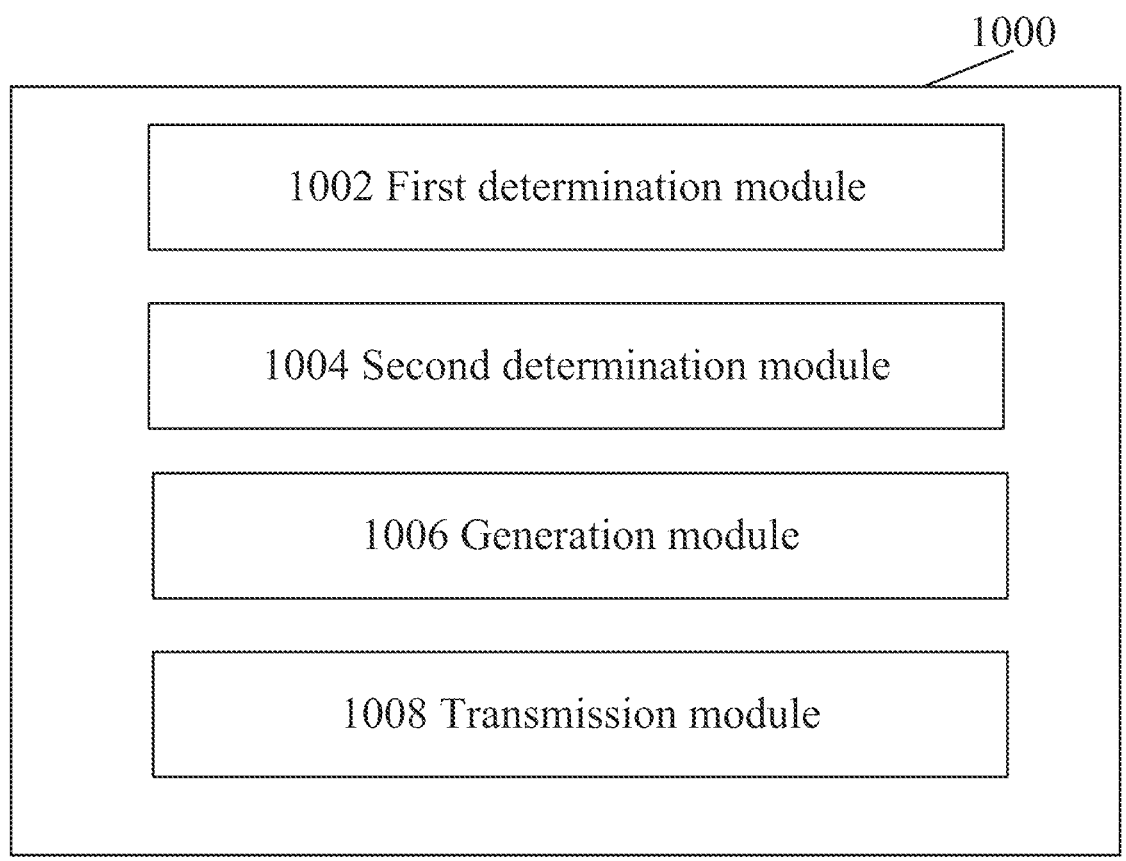
FIG. 10 is a block diagram illustrating a network device according to an embodiment of the disclosure.

FIG. 10 depicts a network device 1000 capable of implementing the method for TA adjustment as described above. As shown in FIG. 10, the network device 1000 comprises a first determination module 1002 for determining a TA value for a terminal device; a second determination module 1004 for determining a TA granularity or range for the terminal device; a generation module 1006 for generating a TA command based at least partly on the TA value and the TA granularity or range; and a transmission module 1008 for sending the TA command to the terminal device.

In an embodiment, different numerologies are configured for at least two carriers, wherein the at least two carriers serve the terminal device and the terminal device supports multiple numerologies.

In an embodiment, the TA granularity is determined by a numerology of multiple numerologies used by the terminal device. There is a correspondence between numerology and TA granularity.

In an embodiment, different numerologies are configured for at least two carriers and/or at least two bandwidth parts, BWPs, in one carrier, wherein the at least two carriers and/or the at least two BWPs serve the terminal device and the terminal device supports at least one numerology.

In an embodiment, the TA granularity or range is determined by at least one of a cyclic prefix (CP) length, a numerology and a carrier frequency used by the terminal device, wherein there is a correspondence between CP length and TA granularity or range, a correspondence between numerology and TA granularity or range, and a correspondence between carrier frequency and TA granularity or range, wherein the correspondences are preconfigured in the network device and/or the correspondences are preconfigured in the terminal device or signaled to the terminal device.

In an embodiment, the transmission module 1008 is configured to send a message containing the TA granularity or range to the terminal device.

In an embodiment, the carrier comprises a plurality of BWPs, each BWP is associated with a numerology, and the carrier has a reference numerology, wherein the TA granularity or range is determined based on the reference numerology and the reference numerology is a numerology with the shortest CP length.

In an embodiment, a reference numerology assigned for terminal devices under an idle state is same in a cell.

In an embodiment, a format of the TA command is same as a format of the TA command used in a wireless network supporting single numerology operation.

In an embodiment, a format of the TA command is different from a format of the TA command used in a wireless network supporting single numerology operation.

In an embodiment, the format of the TA command changes in relation to the TA command field length change.

In an embodiment, there is a correspondence between the format of the TA command and the TA granularity or range, the network device 1000 further comprises a third determination module (not shown) for determining the format of the TA command based on the TA granularity or range.

In an embodiment, the format of the TA command comprises an indicator of the TA granularity or range.

In an embodiment, the TA command is sent together with uplink grant or a medium access control (MAC) command associated with uplink grant, wherein the TA granularity or range is determined based on a numerology used for the UL grant or the numerology of PUSCH scheduled by the UL grant.

Figure 11:
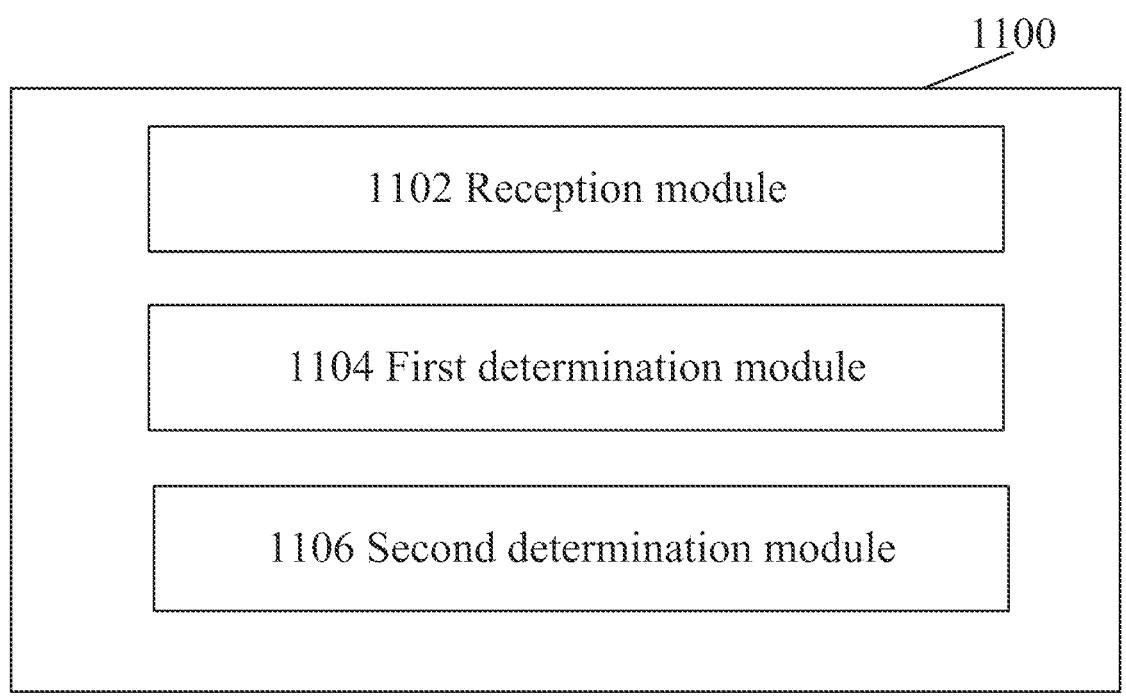
FIG. 11 is a block diagram illustrating a terminal device according to an embodiment of the disclosure.

FIG. 11 depicts a terminal device 1100 capable of implementing the methods for TA adjustment as described above. As shown in FIG. 11, the terminal device 1100 comprises a reception module 1102 for receiving a TA command from a network device; a first determination module 1104 for determining a TA granularity or range; and a second determination module 1106 for determining a TA value based at least partly on the TA command and the TA granularity or range.

In an embodiment, different numerologies are configured for at least two carriers, wherein the at least two carriers serve the terminal device and the terminal device supports multiple numerologies.

In an embodiment, the TA granularity is determined by a numerology of multiple numerologies used by the terminal device. There is a correspondence between numerology and TA granularity.

In an embodiment, different numerologies are configured for at least two carriers and/or at least two bandwidth parts, BWPs, in one carrier, wherein the at least two carriers and/or the at least two BWPs serve the terminal device and the terminal device supports at least one numerology.

In an embodiment, the TA granularity or range is determined by one or more of a cyclic prefix (CP) length, a numerology and a carrier frequency used by the terminal device, wherein there is a correspondence between CP length and TA granularity or range, a correspondence between numerology and TA granularity or range, and a correspondence between carrier frequency and TA granularity or range, wherein the correspondences are preconfigured in the network device and/or the correspondences are preconfigured in the terminal device or signaled to the terminal device.

In an embodiment, the reception module 1102 is configured to receive a message containing the TA granularity or range from the network device.

In an embodiment, the carrier comprises a plurality of BWPs, each BWP is associated with a numerology, and the carrier has a reference numerology, wherein the TA granularity or range is determined based on the reference numerology and the reference numerology is a numerology with the shortest CP length.

In an embodiment, a reference numerology assigned for terminal devices under an idle state is same in a cell.

In an embodiment, the terminal device 1100 further comprises an update module (not shown) for updating a previous TA value considering the difference of between an old TA granularity or range and a new TA granularity or range; a calculation module (not shown) for calculating a TA compensation based on the new TA command and the new TA granularity or range; and a third determination module (not shown) for determining the TA value based on the updated previous TA value and the TA compensation.

In an embodiment, a format of the TA command is same as a format of the TA command used in a wireless network supporting single numerology operation.

In an embodiment, a format of the TA command is different from a format of the TA command used in a wireless network supporting single numerology operation.

In an embodiment, the format of the TA command changes in relation to the TA command field length change.

In an embodiment, there is a correspondence between the format of the TA command and the TA granularity or range, the method further comprises determining the format of the TA command based on the TA granularity or range.

In an embodiment, the format of the TA command comprises an indicator of the TA granularity or range.

In an embodiment, the TA command is received together with uplink grant or a medium access control (MAC) command associated with uplink grant, wherein the TA granularity or range is determined based on a numerology used for the UL grant or the numerology of PUSCH scheduled by the UL grant.

Figure 12:
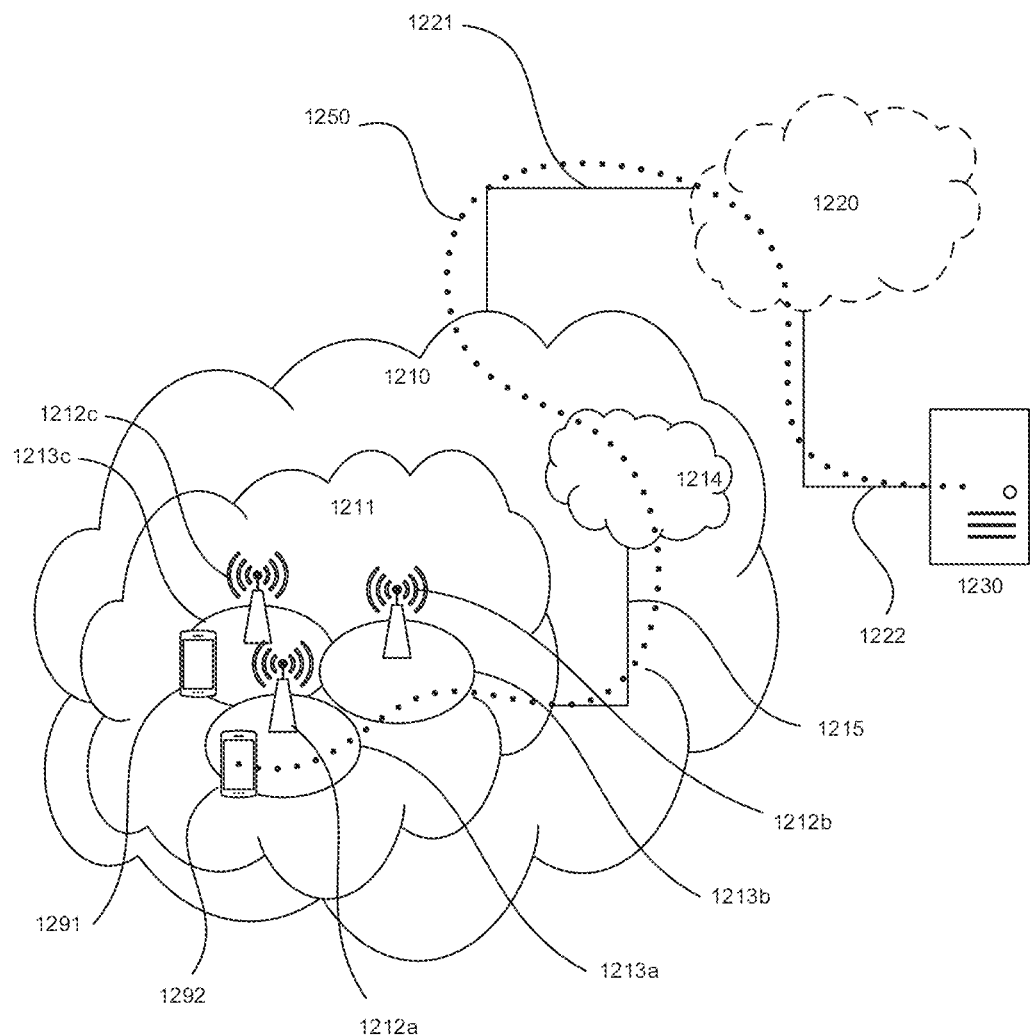
FIG. 12 is a block diagram illustrating a telecommunication network connected via an intermediate network to a host computer in accordance with some embodiments of the present disclosure.

FIG. 12 is a block diagram illustrating a telecommunication network connected via an intermediate network to a host computer in accordance with some embodiments of the present disclosure.

With reference to FIG. 12, in accordance with an embodiment, a communication system includes a telecommunication network 1210, such as a 3GPP-type cellular network, which comprises an access network 1211, such as a radio access network, and a core network 1214. The access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to the core network 1214 over a wired or wireless connection 1215. A first UE 1291 located in a coverage area 1213c is configured to wirelessly connect to, or be paged by, the corresponding base station 1212c. A second UE 1292 in a coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

The telecommunication network 1210 is itself connected to a host computer 1230, which may be embodied in the hardware and/or software of a standalone server, a cloud-implemented server, a distributed server or as processing resources in a server farm. The host computer 1230 may be under the ownership or control of a service provider, or may be operated by the service provider or on behalf of the service provider. Connections 1221 and 1222 between the telecommunication network 1210 and the host computer 1230 may extend directly from the core network 1214 to the host computer 1230 or may go via an optional intermediate network 1220. An intermediate network 1220 may be one of, or a combination of more than one of, a public, private or hosted network; the intermediate network 1220, if any, may be a backbone network or the Internet; in particular, the intermediate network 1220 may comprise two or more sub-networks (not shown).

The communication system of FIG. 12 as a whole enables connectivity between the connected UEs 1291, 1292 and the host computer 1230. The connectivity may be described as an over-the-top (OTT) connection 1250. The host computer 1230 and the connected UEs 1291, 1292 are configured to communicate data and/or signaling via the OTT connection 1250, using the access network 1211, the core network 1214, any intermediate network 1220 and possible further infrastructure (not shown) as intermediaries. The OTT connection 1250 may be transparent in the sense that the participating communication devices through which the OTT connection 1250 passes are unaware of routing of uplink and downlink communications. For example, the base station 1212 may not or need not be informed about the past routing of an incoming downlink communication with data originating from the host computer 1230 to be forwarded (e.g., handed over) to a connected UE 1291. Similarly, the base station 1212 need not be aware of the future routing of an outgoing uplink communication originating from the UE 1291 towards the host computer 1230.

Figure 13:
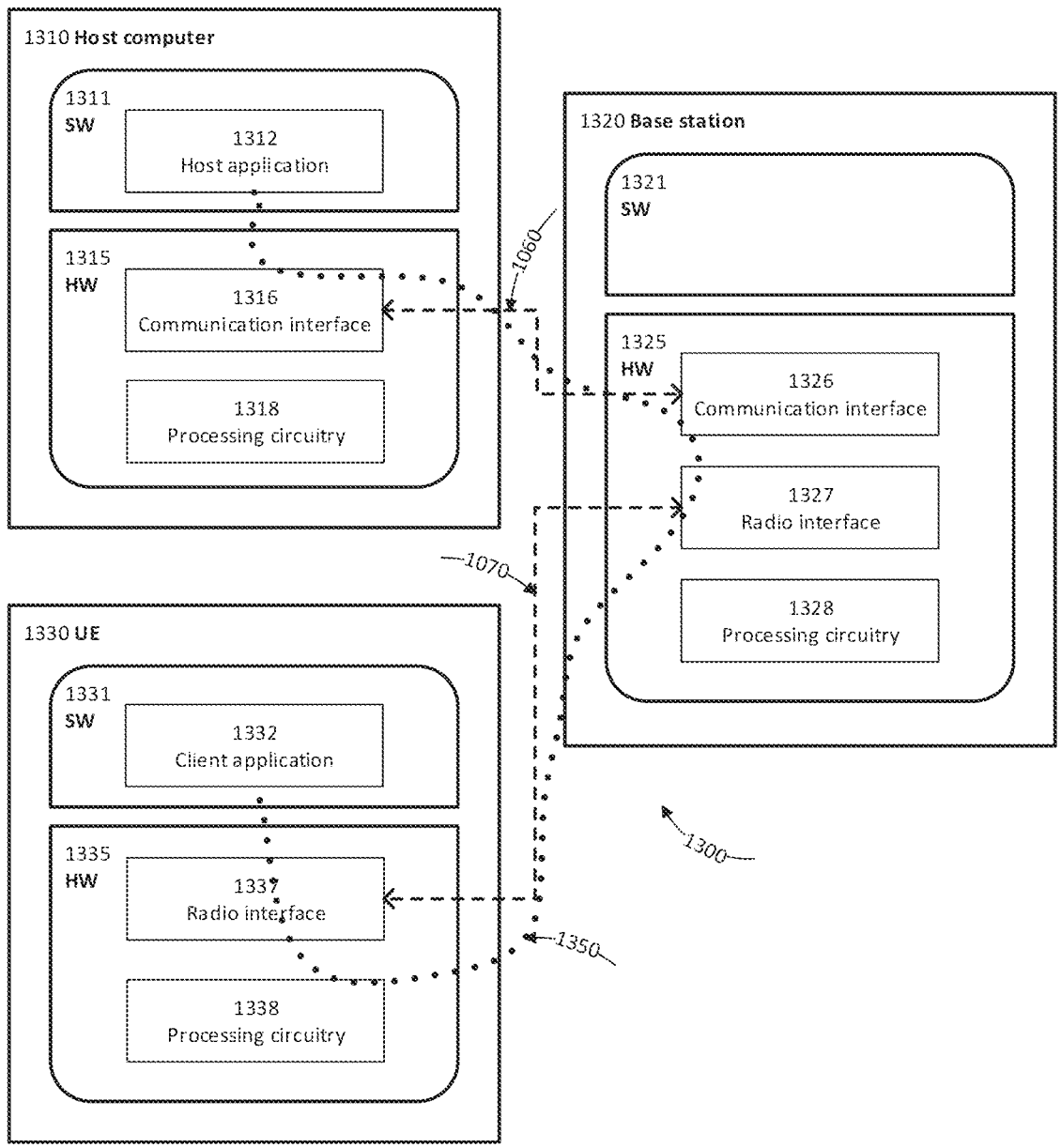
FIG. 13 is a block diagram illustrating a host computer communicating via a base station with a UE over a partially wireless connection in accordance with some embodiments of the present disclosure.

FIG. 13 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 13. In a communication system 1300, a host computer 1310 comprises hardware 1315 including a communication interface 1316 configured to set up and maintain a wired or wireless connection with an interface of a different communication device of the communication system 1300. The host computer 1310 further comprises a processing circuitry 1318, which may have storage and/or processing capabilities. In particular, the processing circuitry 1318 may comprise one or more programmable processors, application-specific integrated circuits, field programmable gate arrays or combinations of these (not shown) adapted to execute instructions. The host computer 1310 further comprises software 1311, which is stored in or accessible by the host computer 1310 and executable by the processing circuitry 1318. The software 1311 includes a host application 1312. The host application 1312 may be operable to provide a service to a remote user, such as UE 1330 connecting via an OTT connection 1350 terminating at the UE 1330 and the host computer 1310. In providing the service to the remote user, the host application 1312 may provide user data which is transmitted using the OTT connection 1350.

The communication system 1300 further includes a base station 1320 provided in a telecommunication system and comprising hardware 1325 enabling it to communicate with the host computer 1310 and with the UE 1330. The hardware 1325 may include a communication interface 1326 for setting up and maintaining a wired or wireless connection with an interface of a different communication device of the communication system 1300, as well as a radio interface 1327 for setting up and maintaining at least a wireless connection 1370 with the UE 1330 located in a coverage area (not shown in FIG. 13) served by the base station 1320. The communication interface 1326 may be configured to facilitate a connection 1360 to the host computer 1310. The connection 1360 may be direct or it may pass through a core network (not shown in FIG. 13) of the telecommunication system and/or through one or more intermediate networks outside the telecommunication system. In the embodiment shown, the hardware 1325 of the base station 1320 further includes a processing circuitry 1328, which may comprise one or more programmable processors, application-specific integrated circuits, field programmable gate arrays or combinations of these (not shown) adapted to execute instructions. The base station 1320 further has software 1321 stored internally or accessible via an external connection.

The communication system 1300 further includes the UE 1330 already referred to. Its hardware 1335 may include a radio interface 1337 configured to set up and maintain a wireless connection 1370 with a base station serving a coverage area in which the UE 1330 is currently located. The hardware 1335 of the UE 1330 further includes a processing circuitry 1338, which may comprise one or more programmable processors, application-specific integrated circuits, field programmable gate arrays or combinations of these (not shown) adapted to execute instructions. The UE 1330 further comprises software 1331, which is stored in or accessible by the UE 1330 and executable by the processing circuitry 1338. The software 1331 includes a client application 1332. The client application 1332 may be operable to provide a service to a human or non-human user via the UE 1330, with the support of the host computer 1310. In the host computer 1310, an executing host application 1312 may communicate with the executing client application 1332 via the OTT connection 1350 terminating at the UE 1330 and the host computer 1310. In providing the service to the user, the client application 1332 may receive request data from the host application 1312 and provide user data in response to the request data. The OTT connection 1350 may transfer both the request data and the user data. The client application 1332 may interact with the user to generate the user data that it provides.

It is noted that the host computer 1310, the base station 1320 and the UE 1330 illustrated in FIG. 13 may be similar or identical to the host computer 1230, one of base stations 1212*a*, 1212*b*, 1212*c* and one of UEs 1291, 1292 of FIG. 12, respectively. This is to say, the inner workings of these entities may be as shown in FIG. 13 and independently, the surrounding network topology may be that of FIG. 12.

In FIG. 13, the OTT connection 1350 has been drawn abstractly to illustrate the communication between the host computer 1310 and the UE 1330 via the base station 1320, without explicit reference to any intermediary devices and the precise routing of messages via these devices. Network infrastructure may determine the routing, which it may be configured to hide from the UE 1330 or from the service provider operating the host computer 1310, or both. While the OTT connection 1350 is active, the network infrastructure may further take decisions by which it dynamically changes the routing (e.g., on the basis of load balancing consideration or reconfiguration of the network).

Wireless connection 1370 between the UE 1330 and the base station 1320 is in accordance with the teachings of the embodiments described throughout this disclosure. One or more of the various embodiments improve the performance of OTT services provided to the UE 1330 using the OTT connection 1350, in which the wireless connection 1370 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 1350 between the host computer 1310 and the UE 1330, in response to variations in the measurement results. The measurement procedure and/or the network functionality for reconfiguring the OTT connection 1350 may be implemented in software 1311 and hardware 1315 of the host computer 1310 or in software 1331 and hardware 1335 of the UE 1330, or both. In embodiments, sensors (not shown) may be deployed in or in association with communication devices through which the OTT connection 1350 passes; the sensors may participate in the measurement procedure by supplying values of the monitored quantities exemplified above, or supplying values of other physical quantities from which the software 1311, 1331 may compute or estimate the monitored quantities. The reconfiguring of the OTT connection 1350 may include message format, retransmission settings, preferred routing etc.; the reconfiguring need not affect the base station 1320, and it may be unknown or imperceptible to the base station 1320. Such procedures and functionalities may be known and practiced in the art. In certain embodiments, measurements may involve proprietary UE signaling facilitating the host computer 1310's measurements of throughput, propagation times, latency and the like. The measurements may be implemented in that the software 1311 and 1331 causes messages to be transmitted, in particular empty or 'dummy' messages, using the OTT connection 1350 while it monitors propagation times, errors etc.

Figure 14:
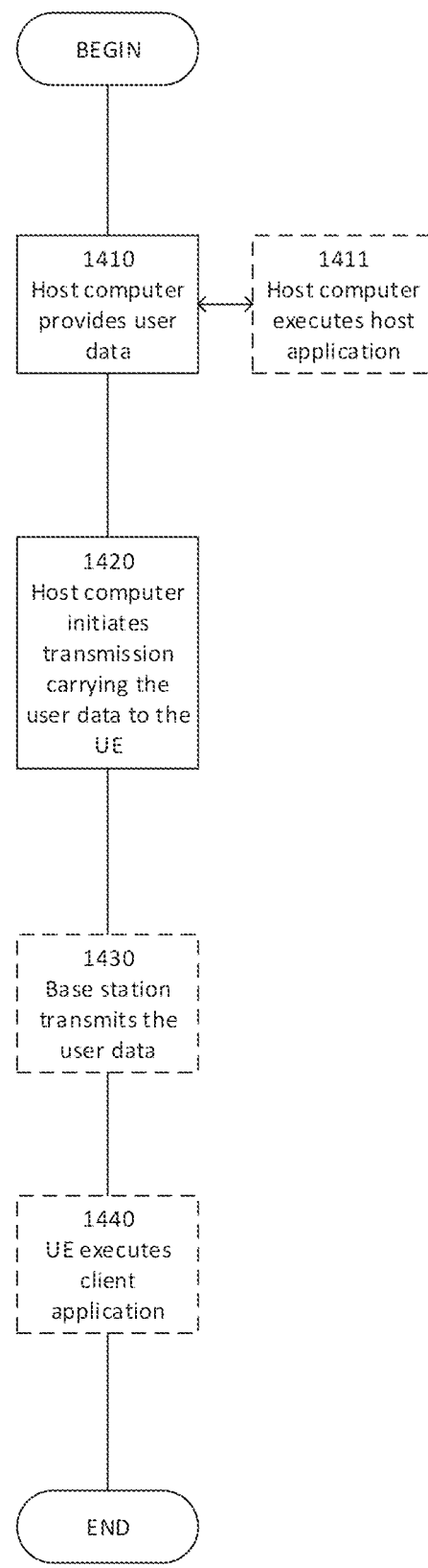
FIG. 14 is a flowchart illustrating a method implemented in a communication system, in accordance with an embodiment of the present disclosure.

FIG. 14 is a flowchart illustrating a method implemented in a communication system, in accordance with an embodiment. The communication system includes a host computer, a base station and a UE which may be those described with reference to FIG. 12 and FIG. 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 15:
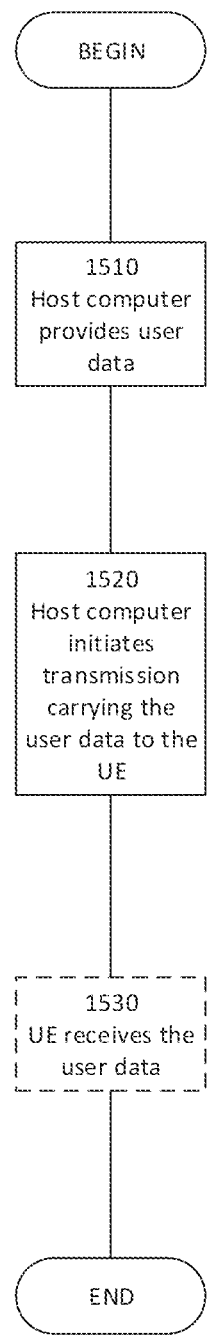
FIG. 15 is a flowchart illustrating a method implemented in a communication system, in accordance with an embodiment of the present disclosure.

FIG. 15 is a flowchart illustrating a method implemented in a communication system, in accordance with an embodiment. The communication system includes a host computer, a base station and a UE which may be those described with reference to FIG. 12 and FIG. 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figure 16:
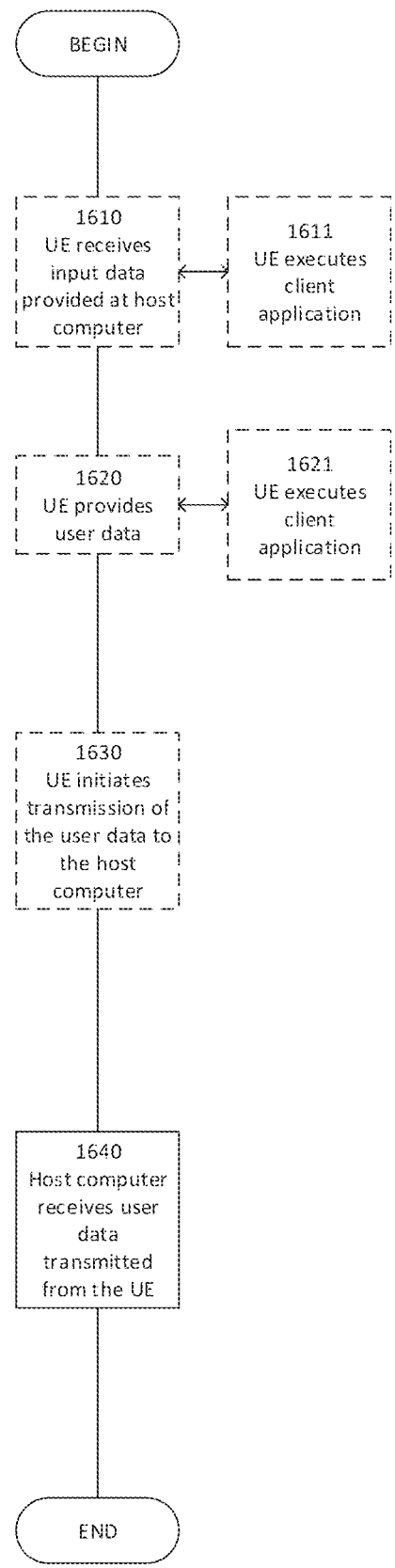
FIG. 16 is a flowchart illustrating a method implemented in a communication system, in accordance with an embodiment of the present disclosure.

FIG. 16 is a flowchart illustrating a method implemented in a communication system, in accordance with an embodiment. The communication system includes a host computer, a base station and a UE which may be those described with reference to FIG. 12 and FIG. 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

Figure 17:
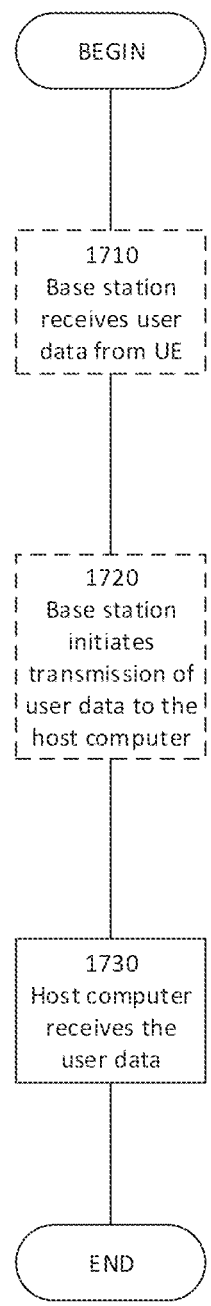
FIG. 17 is a flowchart illustrating a method implemented in a communication system, in accordance with an embodiment of the present disclosure.

FIG. 17 is a flowchart illustrating a method implemented in a communication system, in accordance with an embodiment. The communication system includes a host computer, a base station and a UE which may be those described with reference to FIG. 12 and FIG. 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

It is noted that any of the components of the network device and terminal device can be implemented as hardware or software modules. In the case of software modules, they can be embodied on a tangible computer-readable recordable storage medium. All of the software modules (or any subset thereof) can be on the same medium, or each can be on a different medium, for example. The software modules can run, for example, on a hardware processor. The method steps can then be carried out using the distinct software modules, as described above, executing on a hardware processor.

The terms "computer program", "software" and "computer program code" are meant to include any sequences or human or machine cognizable steps which perform a function. Such program may be rendered in virtually any programming language or environment including, for example, C/C++, Fortran, COBOL, PASCAL, assembly language, markup languages (e.g., HTML, SGML, XML), and the like, as well as object-oriented environments such as the Common Object Request Broker Architecture (CORBA), Java™ (including J2ME, Java Beans, etc.), Binary Runtime Environment (BREW), and the like.

The terms "memory" and "storage device" are meant to include, but not limited to, an electronic, magnetic, optical, electromagnetic, infrared, or semiconductor system, apparatus, or device, or any suitable combination of the foregoing. More specific examples (a non-exhaustive list) of the memory or storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the disclosure provided herein, one of ordinary skill in the related art will be able to contemplate other implementations of the components of the disclosure.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. A host computer configured to operate in a communication system to provide an over-the-top (OTT) service, the host computer comprising:
   processing circuitry configured to provide user data associated with the OTT service; and
   a network interface configured to initiate transmission of the user data to a network node in a cellular network for transmission to a user equipment (UE), the network node having a communication interface and processing circuitry, the processing circuitry of the network node configured to perform operations comprising:
   determine a time advance (TA) value for the UE, wherein different numerologies are configured for at least two carriers and at least two active bandwidth parts (BWPs), the at least two carriers belonging to a Timing Advance Group (TAG), each active BWP being associated with a numerology and each numerology having a subcarrier spacing (SCS);
   determine a TA granularity for the UE, wherein the TA granularity of the TAG is determined based on the numerology having the largest SCS of the different numerologies;
   generate a TA command based at least partly on the TA value and the TA granularity;
   send the TA command to the UE; and
   transmit the user data, provided by the processing circuitry of the host computer, to the UE.

2. The host computer of claim 1, wherein:
   the processing circuitry of the host is configured to execute a host application that provides the user data; and
   the host application is configured to communicate with a client application associated with the host application to receive the transmission of user data from the host.

3. The host computer of claim 1, wherein the TA granularity is determined by a numerology of the different numerologies used by the UE, wherein there is a correspondence between the numerology and the TA granularity.

4. The host computer of claim 1, wherein the different numerologies are configured for the at least two carriers and the at least two BWPs in one carrier.

5. A communication system configured to provide an over-the-top (OTT) service, the communication system comprising:
   a host comprising:
   processing circuitry configured to provide user data for a user equipment (UE), the user data being associated with the OTT service; and
   a network interface configured to initiate transmission of the user data toward a cellular network node for transmission to the UE, the network node having a communication interface and processing circuitry, the processing circuitry of the network node configured to:
      determine a time advance (TA) value for the UE, wherein different numerologies are configured for at least two carriers and at least two active bandwidth parts (BWPs), the at least two carriers belong to a Timing Advance Group (TAG) each active BWP is associated with a numerology and each numerology having a subcarrier spacing (SCS);
      determine a TA granularity for the UE, wherein the TA granularity of the TAG is determined based on the numerology having the largest SCS of the different numerologies;
      generate a TA command based at least partly on the TA value and the TA granularity;
      send the TA command to the UE; and
      transmit the user data associated with the OTT service to the UE.

6. The communication system of claim 5, further comprising:
   the network node; and/or
   the user equipment.

7. The communication system of claim 5, wherein:
   the processing circuitry of the host is configured to execute a host application that provides the user data; and
   the host application is configured to communicate with a client application associated with the host application to receive the transmission of user data from the host.

8. The communication system of claim 7, wherein the host application and the client application are associated with a provider of the OTT service.

9. The communication system of claim 5, wherein the TA granularity is determined by a numerology of the different numerologies used by the UE, wherein there is a correspondence between the numerology and the TA granularity.

10. The communication system of claim 5, wherein the different numerologies are configured for the at least two carriers and the at least two BWPs in one carrier.

11. A method implemented by a host computer, the host computer being configured to operate in a communication system that further includes a network node and a user equipment (UE) to provide an over-the-top (OTT) service, the method comprising:
providing user data for the UE, the user data being associated with the OTT service; and
initiating a transmission carrying the user data to the UE via a cellular network comprising the network node, wherein the processing circuitry of the network node is configured to perform the following operations to transmit the user data from the host computer to the UE:
determine a time advance (TA) value for the UE, wherein different numerologies are configured for at least two carriers and at least two active bandwidth parts (BWPs), the at least two carriers belonging to a Timing Advance Group (TAG), each active BWP being associated with a numerology and each numerology having a subcarrier spacing (SCS);
determine a TA granularity for the UE, wherein the TA granularity of the TAG is determined based on the numerology having the largest SCS of the different numerologies;
generate a TA command based at least partly on the TA value and the TA granularity;
send the TA command to the UE; and
transmit the user data, provided by the processing circuitry of the host computer, to the UE.

12. The method of claim 11, wherein the user data is provided at the host by executing a host application that interacts with a client application executing on the UE, the client application being associated with the host application.

13. The method of claim 11, wherein the TA granularity is determined by a numerology of the different numerologies used by the UE, wherein there is a correspondence between the numerology and the TA granularity.

14. The method of claim 11, wherein the different numerologies are configured for the at least two carriers and the at least two BWPs in one carrier.

* * * * *

UNITED STATES PATENT AND TRADEMARK OFFICE
CERTIFICATE OF CORRECTION

PATENT NO. : 11,523,361 B2
APPLICATION NO. : 17/581708
DATED : December 6, 2022
INVENTOR(S) : Liu et al.

Page 1 of 3

It is certified that error appears in the above-identified patent and that said Letters Patent is hereby corrected as shown below:

In the Drawings

In Fig. 5, Sheet 4 of 16, delete "Granlarity" and insert -- Granularity --, therefor.

In Fig. 7, Sheet 6 of 16, for Tag "708", in Line 1, delete "Recieve" and insert -- Receive --, therefor.

In Fig. 13, Sheet 12 of 16, delete Tag "1060" and insert Tag -- 1360 --, therefor.

In Fig. 13, Sheet 12 of 16, delete Tag "1070" and insert Tag -- 1370 --, therefor.

In the Specification

In Column 1, Line 9, delete "2018," and insert -- 2018, now U.S. Pat. No. 11,284,367, --, therefor.

In Column 2, Line 1, delete "RANI" and insert -- RAN1 --, therefor.

In Column 6, Line 32, delete "numerologies" and insert -- numerologies. --, therefor.

In Column 9, Line 36, delete "is flow" and insert -- is a flow --, therefor.

In Column 9, Line 38, delete "is flow" and insert -- is a flow --, therefor.

In Column 9, Line 64, delete "disclosure; and" and insert -- disclosure; --, therefor.

In Column 10, Line 37, delete "refers" and insert -- refers to --, therefor.

In Column 11, Line 32, delete "(JOT)" and insert -- (IoT) --, therefor.

In Column 12, Line 36, delete "more a" and insert -- more of a --, therefor.

Signed and Sealed this
Eleventh Day of July, 2023

Katherine Kelly Vidal
*Director of the United States Patent and Trademark Office*

CERTIFICATE OF CORRECTION (continued)
U.S. Pat. No. 11,523,361 B2

In Column 12, Line 40, delete "more a" and insert -- more of a --, therefor.

In Column 13, Line 2, delete "TA" and insert -- $T_A$ --, therefor.

In Column 13, Line 32, delete "TA (0, 1, 2 . . . 63)" and insert -- $T_A$ (0, 1, 2 . . . 63) --, therefor.

In Column 14, Line 10, delete "as is described" and insert -- as described --, therefor.

In Column 17, Line 11, delete "their" and insert -- whether their --, therefor.

In Column 17, Line 38, delete "Turn" and insert -- Turning --, therefor.

In Column 18, Line 59, delete "an case" and insert -- a case --, therefor.

In Column 18, Line 67, delete "an case" and insert -- a case --, therefor.

In Column 19, Line 3, delete "is flow" and insert -- is a flow --, therefor.

In Column 20, Line 9, delete "Turn" and insert -- Turning --, therefor.

In Column 20, Line 16, delete "of between" and insert -- between --, therefor.

In Column 20, Line 27, delete "recent" and insert -- recently --, therefor.

In Column 20, Line 29, delete "is flow" and insert -- is a flow --, therefor.

In Column 21, Line 34, delete "Turn" and insert -- Turning --, therefor.

In Column 21, Line 42, delete "of between" and insert -- between --, therefor.

In Column 21, Line 54, delete "recent" and insert -- recently --, therefor.

In Column 22, Line 4, delete "an enough" and insert -- enough --, therefor.

In Column 22, Line 37, delete "an case" and insert -- a case --, therefor.

In Column 24, Line 1, delete "of between" and insert -- between --, therefor.

In Column 24, Line 20, delete "comprises" and insert -- comprise --, therefor.

In Column 25, Line 33, delete "comprises" and insert -- comprise --, therefor.

In Column 26, Line 18, delete "of between" and insert -- between --, therefor.

In Column 28, Line 40, delete "of between" and insert -- between --, therefor.

CERTIFICATE OF CORRECTION (continued)
U.S. Pat. No. 11,523,361 B2

In Column 32, Line 52, delete "substep 1630" and insert -- step 1630 --, therefor.

In Column 33, Line 25, delete "Environment" and insert -- Environment for Wireless --, therefor.

In Column 33, Line 42, delete "(ASICS)," and insert -- (ASICs), --, therefor.